(12) United States Patent
Nakayama et al.

(10) Patent No.: US 11,472,222 B2
(45) Date of Patent: Oct. 18, 2022

(54) MULTIFUNCTION PEN

(71) Applicant: MITSUBISHI PENCIL COMPANY, LIMITED, Tokyo (JP)

(72) Inventors: Kyo Nakayama, Tokyo (JP); Shinichi Ushiku, Tokyo (JP); Tsuyoshi Nishida, Tokyo (JP); Masashi Sakagami, Tokyo (JP); Satoru Okabe, Tokyo (JP); Yusuke Koizumi, Tokyo (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/766,958

(22) PCT Filed: Oct. 24, 2018

(86) PCT No.: PCT/JP2018/039555
§ 371 (c)(1),
(2) Date: May 26, 2020

(87) PCT Pub. No.: WO2019/107023
PCT Pub. Date: Jun. 6, 2019

(65) Prior Publication Data
US 2021/0031557 A1 Feb. 4, 2021

(30) Foreign Application Priority Data
Nov. 28, 2017 (JP) .............................. JP2017-228078

(51) Int. Cl.
*B43K 24/12* (2006.01)
*B43K 24/04* (2006.01)
(Continued)

(52) U.S. Cl.
CPC .............. *B43K 24/12* (2013.01); *B43K 24/04* (2013.01); *B43K 27/00* (2013.01); *B43K 29/00* (2013.01);
(Continued)

(58) Field of Classification Search
CPC ........ B43K 27/08; B43K 27/12; B43K 29/08; B43K 24/026; B43K 24/10; B43K 24/12; G06F 3/03545
See application file for complete search history.

(56) References Cited

U.S. PATENT DOCUMENTS 4,227,822 A    10/1980  Kokubu
4,679,954 A *   7/1987  Ambasz ............... B43K 24/023
                                                    401/214
(Continued)

FOREIGN PATENT DOCUMENTS

CN    103677337 A  *  3/2014  ............. G06F 3/046
JP    54-63926 A       5/1979
(Continued)

OTHER PUBLICATIONS

International Search Report dated Nov. 27, 2018, issued in counterpart International Application No. PCT/JP2018/039555. (2 pages).
(Continued)

*Primary Examiner* — David P Angwin
*Assistant Examiner* — Bradley S Oliver
(74) *Attorney, Agent, or Firm* — WHDA, LLP

(57) ABSTRACT

A multifunction pen is provided including a refill for a writing implement such as a ballpoint pen on a tip end side and including an electromagnetic induction-based electromagnetic induction refill on a rear end side such that there is no need to perform a switching operation between the writing refill and the electromagnetic induction refill. The multifunction pen includes a shaft tube 10 including openings at both of a tip end and a rear end, a writing refill 40 that is housed inside the shaft tube 10 and that includes a writing tip exposed through the opening at the tip end, and an electromagnetic induction refill 50 that is housed inside the shaft tube 10, that is exposed through the opening at the rear
(Continued)

end, and that is employed in electromagnetic induction-based input.

5 Claims, 43 Drawing Sheets

(51) Int. Cl.
    *B43K 27/00*     (2006.01)
    *B43K 29/00*     (2006.01)
    *G06F 3/0354*     (2013.01)
    *G06F 3/046*     (2006.01)

(52) U.S. Cl.
    CPC .......... *G06F 3/03545* (2013.01); *G06F 3/046* (2013.01)

(56) References Cited

U.S. PATENT DOCUMENTS

| | | |
|---|---|---|
| 6,412,998 B1 | 7/2002 | Ham |
| 8,593,437 B2 * | 11/2013 | Liang .................. B43K 24/14 401/99 |
| 10,052,906 B2 * | 8/2018 | Cheon .................. B43K 25/028 |
| 10,589,562 B2 * | 3/2020 | Kaneda .................. B43K 8/22 |
| 10,589,563 B2 * | 3/2020 | Odaka .................. B43K 24/14 |
| 2007/0189832 A1 * | 8/2007 | Yeh .................. B43K 27/08 401/32 |
| 2017/0083122 A1 | 3/2017 | Kanno |
| 2017/0341458 A1 | 11/2017 | Kaneda et al. |

FOREIGN PATENT DOCUMENTS

| | | |
|---|---|---|
| JP | S58-125092 U | 8/1983 |
| JP | 1-89190 U | 6/1989 |
| JP | 2003-48398 A | 2/2003 |
| NO | 2016/129614 A1 | 8/2016 |
| WO | WO-2008156769 A1 * | 12/2008 .......... B43K 23/126 |
| WO | 2016/006281 A1 | 1/2016 |
| WO | 2016/121478 A1 | 8/2016 |

OTHER PUBLICATIONS

Office Action dated Oct. 12, 2021, issued in counterpart to JP Application No. 2017-228078, with English Translation. (11 pages).

* cited by examiner

MULTIFUNCTION PEN

TECHNICAL FIELD

The present invention relates to a multifunction pen.

BACKGROUND ART

Recently, pointing devices such as digitizers are widely used to perform input by physically contacting a screen. Namely, a contact position of a position indicator formed in a shape of a pen is detected when contacting an input screen of a tabular input device provided with a position detection device.

Such digitizers employ various methods, including electromagnetic induction methods. This is a method in which an electromagnetic induction coil is provided in the position indicator so as to resonate in response to electromagnetic waves of a specific frequency generated by the position detection device installed behind the input screen of the input device, and the position at which this resonance occurs misinterpreted as an input position.

WO No. 2016/121478 A1 and WO No. 2016/129614 A1 describe position indicators employing such electromagnetic induction methods.

SUMMARY OF INVENTION

Technical Problem

The position indicators described in WO No. 2016/121478 A1 and WO No. 2016/129614 A1 include a ballpoint pen core and an electromagnetic induction-based electronic pen core. Moreover, the position indicators described in WO No. 2016/121478 A1 and WO No. 2016/129614 A1 require operation of a knock operation section in order to switch between a state in which the ballpoint pen core is in use and a state in which the electronic pen core is in use. An issue exists in that this switching operation is burdensome.

Aspects of the present invention aim to provide a multifunction pen including a refill for a writing implement such as a ballpoint pen on a tip end side and including an electromagnetic induction-based electromagnetic induction refill on a rear end side such that there is no need to perform a switching operation between the writing refill and the electromagnetic induction refill.

Solution to Problem

In order to achieve the above aim, aspects of the present invention are configured as follows.

(1) First Aspect A first aspect of the present invention includes a shaft tube including openings at both of a tip end and a rear end, a writing refill that is housed inside the shaft tube and that includes a writing tip exposed through the opening at the tip end, and an electromagnetic induction refill that is housed inside the shaft tube, that is exposed through the opening at the rear end, and that is employed in electromagnetic induction-based input.

(2) Second Aspect

A second aspect of the present invention is the first aspect, wherein an axial center of a rear end side of the writing refill and an axial center of the electromagnetic induction refill are misaligned with each other.

(3) Third Aspect

A third aspect of the present invention is the first or the second aspect, wherein a plurality of writing refills are housed inside the shaft tube.

(4) Fourth Aspect

A fourth aspect of the present invention is the first, second, or third aspect, wherein a center of mass of the multifunction pen is positioned further toward a rear end side than a center in an axial direction of the shaft tube.

(5) Fifth Aspect

A fifth aspect of the present invention is the first, second, third, or fourth aspect, wherein the electromagnetic induction refill is disposed at an axial center of the shaft tube.

Advantageous Effects of Invention

The aspects of the present invention enable a multifunction pen to be provided including the refill for a writing implement such as a ballpoint pen on the tip end side and including the electromagnetic induction-based electromagnetic induction refill on the rear end side such that there is no need to perform a switching operation between the writing refill and the electromagnetic induction refill.

DESCRIPTION OF EMBODIMENTS

First Exemplary Embodiment

Explanation follows regarding a first exemplary embodiment of the present invention, with reference to the drawings. Unless defined otherwise, in the following explanation a "tip end side" refers to one side, namely the side toward a tip shaft 12, described later, in an axial direction of a multifunction pen 5A, and a "rear end side" refers to the other side, namely the side toward a rear shaft 14, described later.

(1) External Appearance of Multifunction Pen 5A

Figure 1A:
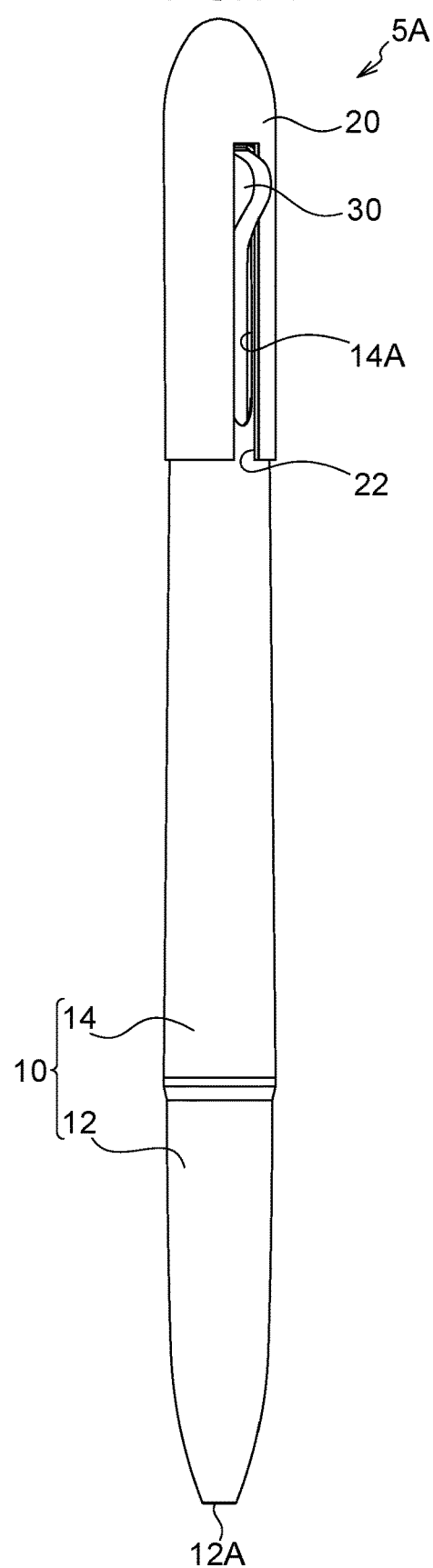
FIG. 1A is a side view illustrating a safe-kept state of a multifunction pen of a first exemplary embodiment.
Figure 1B:
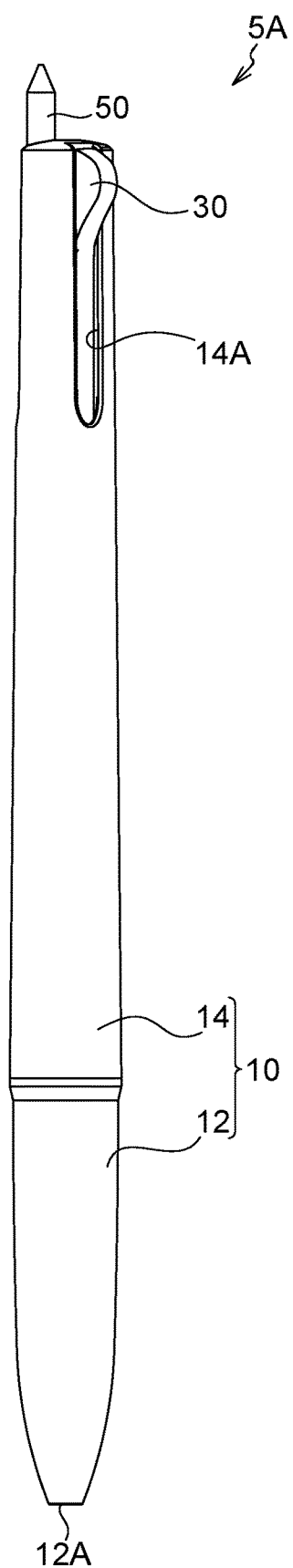
FIG. 1B is a side view illustrating an in-use state of a multifunction pen of the first exemplary embodiment.

The multifunction pen 5A according to the first exemplary embodiment has the external appearance illustrated in FIG. 1A and FIG. 1B. The multifunction pen 5A includes a shaft tube 10 including openings at both of a tip end and a rear end as its external structure. The shaft tube 10 is formed by the rear shaft 14 positioned toward the rear end side, and the tip shaft 12 positioned toward the tip end side being screwed together to each other. The tip end of the tip shaft 12 is formed with an opening at the tip end (hereinafter referred to as a tip end opening 12A, see FIG. 1A and FIG. 1B) through which a ballpoint pen tip 44 of a writing refill 40, described later, protrudes and retreats, and a rear end of the rear shaft 14 is formed with an opening at the rear end (hereinafter referred to as a rear end opening 14B, see FIG. 2A and FIG. 2B) through which an electromagnetic induction refill 50, described later, is exposed. Note that in FIG. 1A, the electromagnetic induction refill 50 described later is illustrated in a safe-kept state in which the electromagnetic induction refill 50 is covered, and in FIG. 1B, the electromagnetic induction refill 50 described later is illustrated in an in-use state in which the electromagnetic induction refill 50 is exposed.

Figure 3:
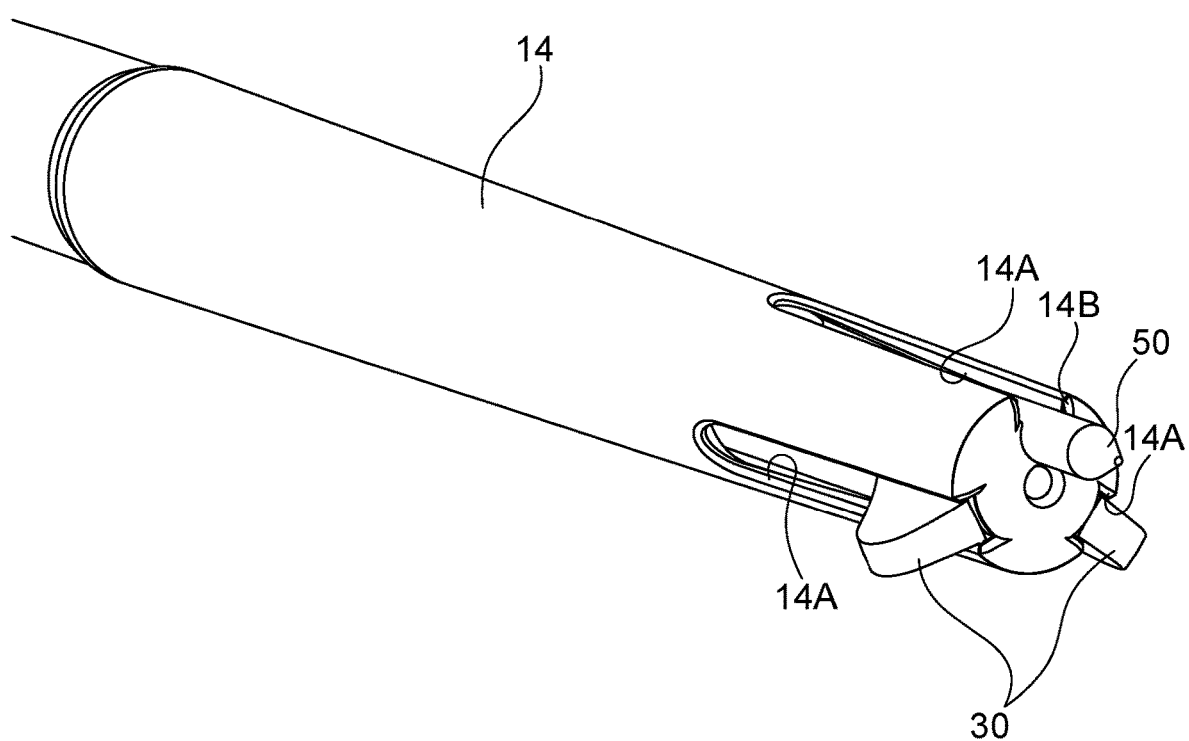
FIG. 3 is a perspective view illustrating a rear end side of a shaft tube of the first exemplary embodiment.

As illustrated in FIG. 3, three window holes 14A configured by elongated holes running along the axial direction are formed in the rear end side of the rear shaft 14. The respective window holes 14A expose two knock rods 30 fitted at the rear of the writing refills 40, described later, and one electromagnetic induction refill 50, described later. The knock rods 30 are each capable of moving toward the front and rear along the corresponding window hole 14A. The electromagnetic induction refill 50 is not capable of moving toward the front and rear along the corresponding window hole 14A. Note that in the first exemplary embodiment, ballpoint pen refills are employed as the writing refills 40.

As illustrated in FIG. 1A, a cap 20 covering the rear end side of the rear shaft 14 is formed with cap holes 22 opening along the axial direction from the tip end of the cap 20 toward the rear end side. The cap holes 22 are formed corresponding to the respective window holes 14A. The cap holes 22 are formed with dimensions corresponding to the respective window holes 14A. Accordingly, even in the safe-kept state illustrated in FIG. 1A, the knock rods 30 are exposed through the window holes 14A and the cap holes 22. The cap 20 is capable of being fitted onto and removed from the rear shaft 14. Accordingly, the cap 20 covers the electromagnetic induction refill 50 in the safe-kept state illustrated in FIG. 1A, such that the electromagnetic induction refill 50 is better protected from shock such as when dropped than in the in-use state illustrated in FIG. 1B. In the in-use state illustrated in FIG. 1B, the cap 20 is removed from the rear shaft 14 to expose the electromagnetic induction refill 50. As will be described in detail later, text or the like can be written on an input device such as a smartphone by dragging the electromagnetic induction refill 50 across an input screen of the input device when in the in-use state.

(2) Interior of Multifunction Pen 5A

Figure 2A:
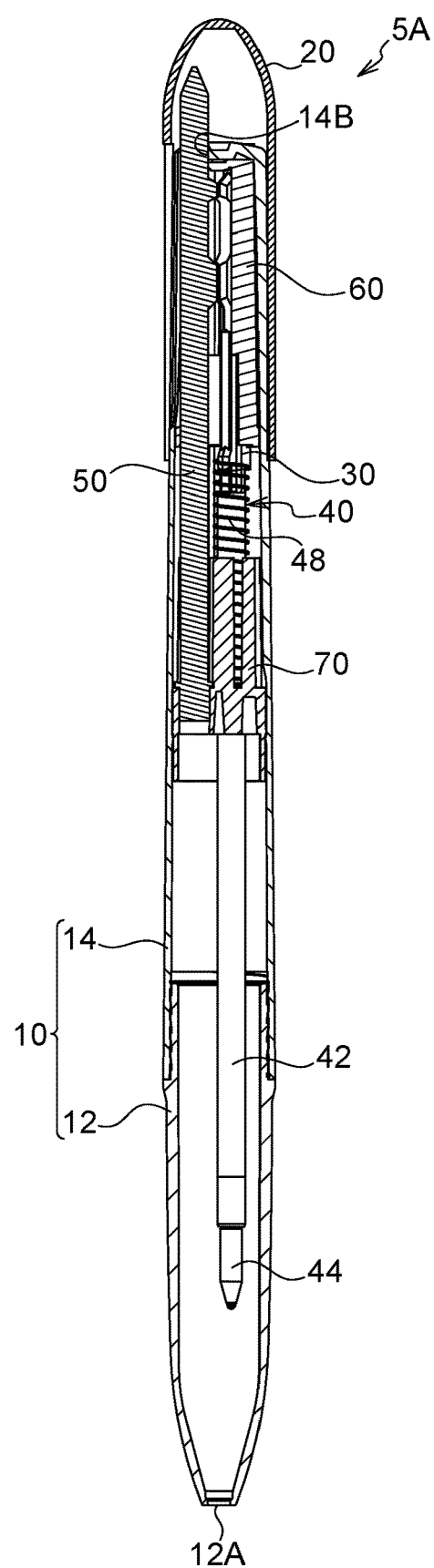
FIG. 2A is a side view cross-section illustrating a safe-kept state of a multifunction pen of the first exemplary embodiment.
Figure 2B:
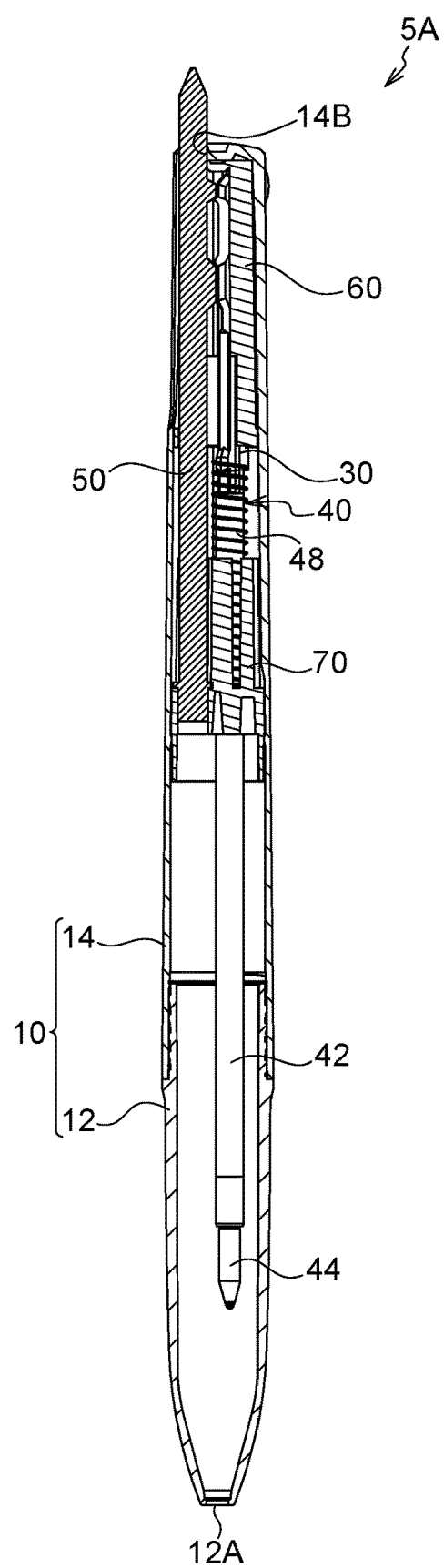
FIG. 2B is a side view cross-section illustrating an in-use state of a multifunction pen of the first exemplary embodiment.

FIG. 2A and FIG. 2B are cross-sections corresponding to the multifunction pen 5A illustrated in FIG. 1A and FIG. 1B, respectively.

Figure 4:
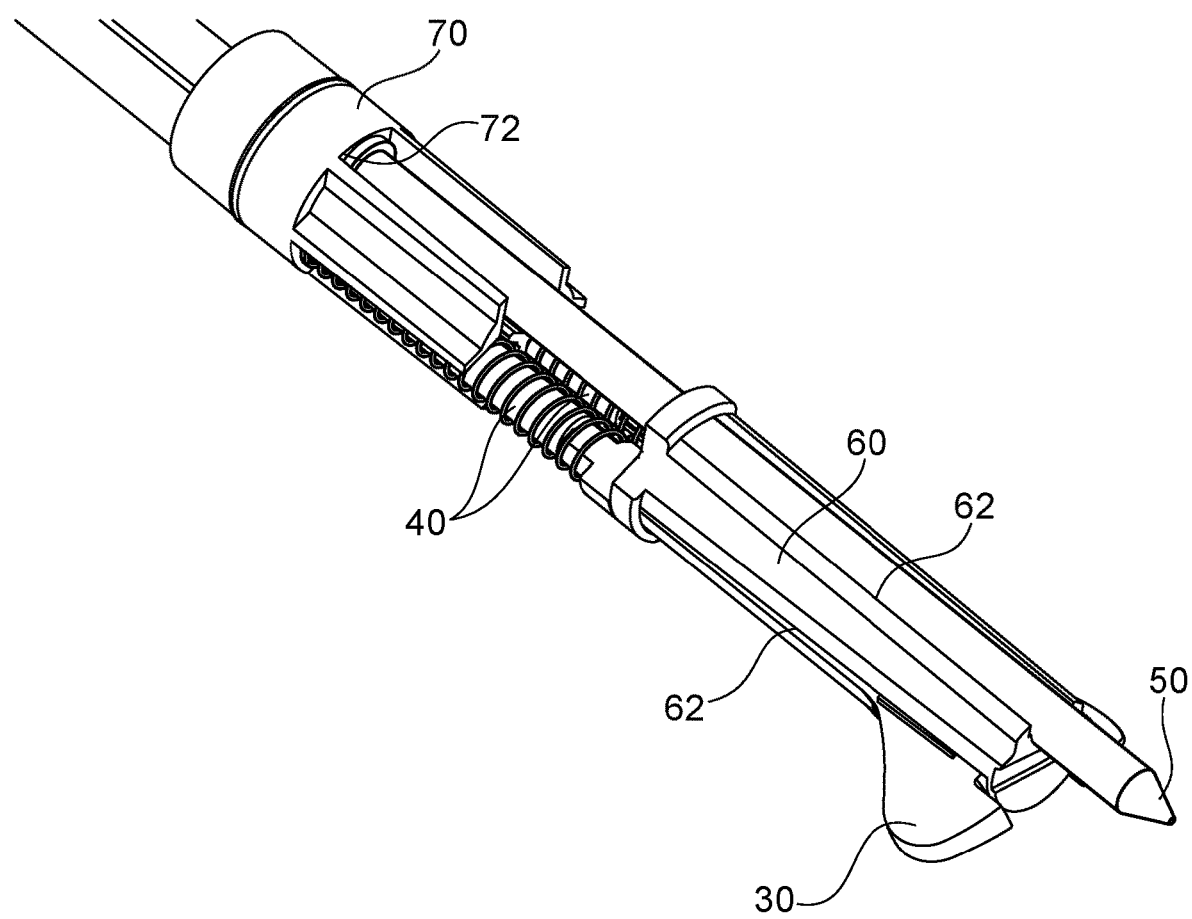
FIG. 4 is a perspective view illustrating a rear end side of a shaft tube of the first exemplary embodiment in a state in which a rear shaft has been removed.

As illustrated in FIG. 2A and FIG. 2B, the knock rods 30 and the electromagnetic induction refill 50 are housed in a rear end side of an internal space of the rear shaft 14. An inner tube 60 that guides movement of the knock rods 30 toward the front and rear is also disposed in the rear end side of the internal space of the rear shaft 14. As illustrated in FIG. 4, the inner tube 60 is formed with housing grooves 62 running along the axial direction that house the knock rods 30 and the electromagnetic induction refill 50.

As illustrated in FIG. 2A and FIG. 2B, a guide tube 70 that guides movement of the writing refills 40 toward the front and rear is disposed inside the internal space of the rear shaft 14 further toward the tip end side than the inner tube 60. The guide tube 70 is provided with a total of three guide holes 72 (see FIG. 4) into which the writing refills 40 and the electromagnetic induction refill 50 are inserted.

The two writing refills 40 are inserted into the two guide holes 72 that are not illustrated in FIG. 4. As illustrated in FIG. 2A and FIG. 2B, each of the writing refills 40 has a structure in which the ballpoint pen tip 44 serving as a writing tip is connected to a tip end of a tube shaped ink reservoir tube 42 in which ink is stored. A spring 48 is fitted around an outer periphery of a rear end side of each of the writing refills 40. Moreover, the corresponding knock rod 30 is connected to the rear end of each of the writing refills 40. A rear end of the spring 48 contacts the knock rod 30, and a tip-side end of the spring 48 contacts a non-illustrated step in the guide tube 70. The spring 48 is thus compressed between the knock rod 30 and the non-illustrated step in the guide tube 70 accompanying movement of the knock rod 30 toward the tip end side. When one of the knock rods 30 is moved toward the tip end side, one of the ballpoint pen tips 44 is exposed through the tip end opening 12A. When the other knock rod 30 is moved toward the tip end side in a state in which the one ballpoint pen tip 44 is exposed, the one ballpoint pen tip 44 retreats into the tip shaft 12 and the other ballpoint pen tip 44 is exposed through the tip end opening 12A.

As illustrated in FIG. 4, the single electromagnetic induction refill 50 is inserted into one of the guide holes 72.

Although the structure of the electromagnetic induction refill 50 is not illustrated in detail in the drawings, the electromagnetic induction refill 50 is employed to perform input using an electromagnetic induction method, and may have the following configuration as an example. Note that in the following explanation, the tip end side of the electromagnetic induction refill 50 refers to the writing side of the electromagnetic induction refill 50, namely the side on which the electromagnetic induction refill 50 is exposed through the rear end opening 14B, and the rear end side of the electromagnetic induction refill 50 refers to the opposite side thereto.

Figure 5A:
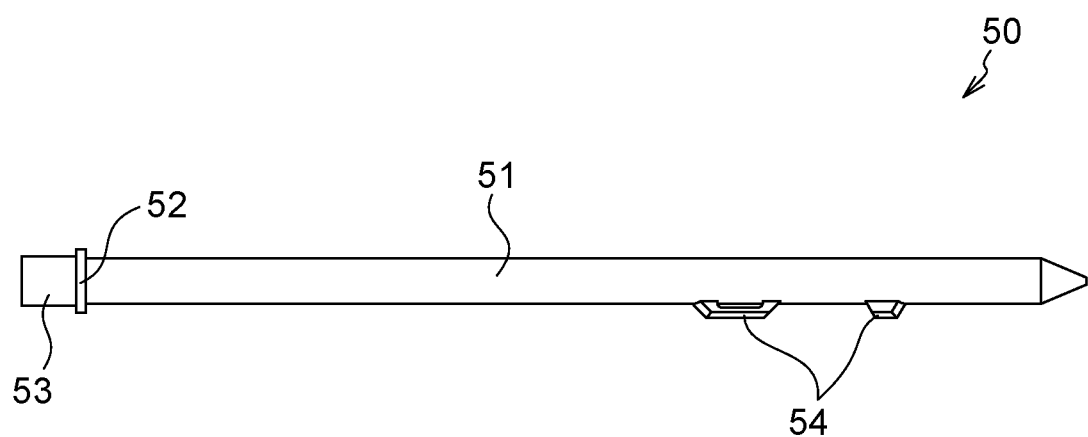
FIG. 5A is a side view illustrating an electromagnetic induction refill of the first exemplary embodiment.
Figure 5B:
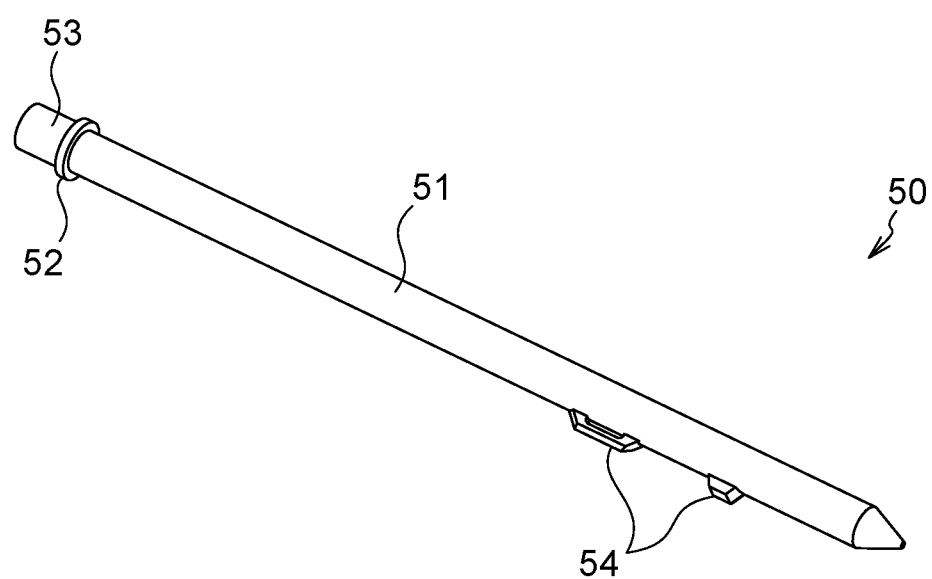
FIG. 5B is a perspective view illustrating an electromagnetic induction refill of the first exemplary embodiment.

As illustrated in FIG. 5A and FIG. 5B, the electromagnetic induction refill 50 includes a housing tube 51 made of a resin. A rod shaped ferrite core is built into the tip end side of the housing tube 51, and a contact tip made of a synthetic resin such as a polyacetal is mounted to a tip-side end of the ferrite core. An electromagnetic induction coil is fitted around the periphery of the ferrite core. A variable electrostatic capacitor and a fixed electrostatic capacitor that are electrically connected to the electromagnetic induction coil, and various passive elements, employed to make fine adjustments to the resonance frequency, are housed in an internal space of the housing tube 51 at the rear end side of the ferrite core. An annular ring portion 52 is provided on the rear end side outside the housing tube 51. A fixing portion 53 is provided at the rear end side of the ring portion 52. The electromagnetic induction refill 50 is fitted in the guide tube 70 by inserting the fixing portion 53 into the guide hole 72 until the ring portion 52 contacts the guide tube 70. Moreover, projections 54 are formed projecting toward the outer side at an outer peripheral face of the housing tube 51. The projections 54 engage with a non-illustrated rail of the inner tube 60 in order to suppress positional misalignment of the electromagnetic induction refill 50. Note that the electromagnetic induction refill 50 can be fitted to and removed from the inner tube 60 and the guide tube 70 such that the electromagnetic induction refill 50 can easily be replaced with a new one if the contact tip wears out or inbuilt electronic devices become faulty.

(3) Other Characteristics

In the first exemplary embodiment, the axial centers of the rear end sides of the writing refills 40 are misaligned with the axial center of the electromagnetic induction refill 50. Specifically, as described above, the writing refills 40 and the electromagnetic induction refill 50 are disposed in different housing grooves 62 and are inserted into different guide holes 72 to each other such that positions of their axial centers are misaligned (see FIG. 4).

Furthermore, in the first exemplary embodiment, in a state in which the ballpoint pen tips 44 have retreated into the tip shaft 12, the center of mass of the multifunction pen 5A is positioned further toward the rear end side than the center in the axial direction of the shaft tube 10. Specifically, since more members (for example, the guide tube 70, the inner tube 60, and the electromagnetic induction refill 50) are housed toward the rear end side of the internal space of the shaft tube 10 than toward the tip end side of the internal space, in the state described above the center of mass of the multifunction pen 5A is positioned further toward the rear end side than the center in the axial direction of the shaft tube 10.

(4) Operation

Explanation follows regarding operation of the first exemplary embodiment, namely the method for using the respective refills.

First, In the writing refills 40 of the first exemplary embodiment, the corresponding knock rod 30 is moved toward the tip end side so as to expose the ballpoint pen tip 44 through the tip end opening 12A. The ballpoint pen tip 44 can then be employed to write text or the like on the surface of paper or the like.

Next, explanation follows regarding the method for using the electromagnetic induction refill 50, namely a sequence in which information is input to an input device (such as a smartphone) using the electromagnetic induction refill 50. Note that the input device is provided with an input screen on which input is performed using the electromagnetic induction refill 50. A position detection device that generates electromagnetic waves at a specific frequency is installed behind the input screen.

First, when the contact tip of the electromagnetic induction refill 50 is pressed, the variable electrostatic capacitor is pressed, thereby increasing the electrostatic capacity. This lowers the resonance frequency.

Note that the position detection device monitors the frequency of the electromagnetic waves generated by the electromagnetic induction refill 50, and is able to detect whether or not writing pressure is being applied to the electromagnetic induction refill 50.

The input device identifies the position where the electromagnetic induction is occurring as coordinate information in order to record drawn lines and the like traced by the contact tip as electronic data. Accordingly, text and the like can be written on the input device by tracing the contact tip across the input screen of the input device.

Note that when the pressing on the contact tip is released, the electrostatic capacity of the variable electrostatic capacitor returns to normal due to the recovery force of a non-illustrated return spring housed in the housing tube 51. Accompanying this, the resonance frequency also returns to that corresponding to a state in which writing pressure is not being applied, such that the position detection device detects that the tip of the electromagnetic induction refill 50 has been removed from the input screen.

(5) Advantageous Effects

The first exemplary embodiment includes the writing refills 40 that are capable of protruding and retreating through the tip end of the shaft tube 10, namely through the tip end opening 12A, and the electromagnetic induction refill 50 that is exposed through the rear end of the shaft tube 10, namely through the rear end opening 14B. Namely, in the multifunction pen 5A including the writing refills 40 and the electromagnetic induction refill 50 of the first exemplary embodiment, the writing refills 40 and the electromagnetic induction refill 50 are exposed on different sides to each other.

Accordingly, in the first exemplary embodiment, no operation (such as operation of the corresponding knock rod 30) is required to cause the writing refill 40 currently exposed from the shaft tube 10 to retreat in order to use the electromagnetic induction refill 50. Due to providing the writing refills 40 at the tip end side of the shaft tube 10 and providing the electromagnetic induction refill 50 at the rear end side of the shaft tube 10, the first exemplary embodiment is capable of providing the multifunction pen 5A in which an operation to switch between the writing refills 40 and the electromagnetic induction refill 50 is not required.

In the first exemplary embodiment, the axial centers of the rear end sides of the writing refills 40 are misaligned with the axial center of the electromagnetic induction refill 50. Since the writing refills 40 and the electromagnetic induction refill 50 can be disposed overlapping each other in the shaft tube 10 in the first exemplary embodiment, the axial direction length of the shaft tube 10 can be shortened in comparison to configurations in which the axial centers of the rear end sides of the writing refills 40 and the axial center of the electromagnetic induction refill 50 are aligned with each other, such as a configuration in which the electromagnetic induction refill 50 is connected to the rear end of a writing refill 40 (referred to hereafter as Comparative Configuration 1). The first exemplary embodiment thereby enables a reduction in size of the multifunction pen 5A in comparison to Comparative Configuration 1 due to the shaft tube 10 having a shorter axial direction length.

In the first exemplary embodiment, the plural writing refills 40, specifically two ballpoint pen refills, are housed inside the shaft tube 10. Accordingly, the first exemplary embodiment is capable of providing the multifunction pen 5A in which an operation to switch between the writing refills 40 and the electromagnetic induction refill 50 is not required, while increasing the number of writing refill types in comparison to configurations in which only a single writing refill 40 is housed in the shaft tube 10. Note that the writing refills 40 housed in the shaft tube 10 are not limited to ballpoint pen refills, and may be other stationery tools. Examples of other stationery tools that may be housed in plural numbers in the shaft tube 10 include mechanical pencils, lead pencils, felt-tip pens, erasers, friction-type touch pen cores, pressure-sensitive touch pen cores, and electrostatic capacitor touch pen cores. Namely, the concept of the writing refill 40 includes the above-mentioned stationery tools.

In the first exemplary embodiment, in a state in which the ballpoint pen tips 44 have retreated into the tip shaft 12, the center of mass of the multifunction pen 5A is positioned further toward the rear end side than the center in the axial direction of the shaft tube 10. Accordingly, the first exemplary embodiment is capable of suppressing the electromagnetic induction refill 50 from shifting under the weight of the multifunction pen 5A when the electromagnetic induction refill 50 is used, thus enabling smoother manipulation of the electromagnetic induction refill 50 than in configurations in which the center of mass of the multifunction pen 5A in the above state is positioned further toward the tip end side than the center in the axial direction of the shaft tube 10.

Moreover, in the first exemplary embodiment, the writing refills 40 are provided at the tip end side of the shaft tube 10, and the electromagnetic induction refill 50 is provided at the rear end side of the shaft tube 10, thereby enabling an effect on the communication of the electromagnetic induction refill 50 to be suppressed in comparison to configurations in which the writing refills 40 and the electromagnetic induction refill 50 are all provided on the same side of the shaft tube 10 (referred to hereafter as Comparative Configuration 2). Note that testing carried out by the applicant confirmed that an effect on the communication of the electromagnetic induction refill 50 arises during use of the electromagnetic induction refill 50 if the electromagnetic induction refill 50 and the writing refills 40 are not separated by a distance of at least 15 mm. This is thought to be since metal materials employed in the writing refills 40 interfere with the ferrite core of the electromagnetic induction refill 50, thus affecting electromagnetic induction.

In Comparative Configuration 2, since the writing refills 40 and the electromagnetic induction refill 50 are exposed on the same side as each other, it is difficult to secure a distance of at least 15 mm between the electromagnetic induction refill 50 and the writing refills 40 when using the electromagnetic induction refill 50. Considering the results of testing, in Comparative Configuration 2 there is a possibility that communication of the electromagnetic induction refill 50 could be affected. By contrast, in the first exemplary embodiment, the writing refills 40 are provided at the tip end side of the shaft tube 10, and the electromagnetic induction refill 50 is provided at the rear end side of the shaft tube 10, thus easily securing a distance of at least 15 mm, and preferably a distance of at least 20 mm, between the electromagnetic induction refill 50 and the writing refills 40. The first exemplary embodiment is thus capable of suppressing an effect on the communication of the electromagnetic induction refill 50 in comparison to Comparative Configuration 2.

In the first exemplary embodiment, the electromagnetic induction refill 50 is covered by the cap 20 in the safe-kept state, such that the electromagnetic induction refill 50 is protected from shocks, for example if dropped. Note that in configurations such as that of Comparative Configuration 2, it is necessary to form a larger internal space in which the tip end portions of the respective refills are housed such that one of these refills can be exposed from the shaft tube 10 without interference between the writing refills 40 and the electromagnetic induction refill 50. Accordingly, in Comparative Configuration 2 the tip end portions of the respective refills are subject to greater movement than necessary if the multifunction pen 5A is dropped, causing greater shock to be imparted to the tip end portions of the respective refills than in the first exemplary embodiment. Namely, in the first exemplary embodiment, the electromagnetic induction refill 50 is covered by the cap 20, enabling the shock imparted to the electromagnetic induction refill 50 if dropped to be less than in Comparative Configuration 2.

In the first exemplary embodiment, the electromagnetic induction refill 50 is supported by the inner tube 60 and the guide tube 70 that correspond to elements traditionally employed for other refill support, such that the multifunction pen 5A is formed including the electromagnetic induction refill 50 and the writing refills 40. Namely, in the first exemplary embodiment, there is no need to provide an additional dedicated member for placement of the electromagnetic induction refill 50 when disposing the electromagnetic induction refill 50. Accordingly, since the first exemplary embodiment employs existing members, the multifunction pen 5A including the electromagnetic induction refill 50 and the writing refills 40 can be formed easily.

Second Exemplary Embodiment

Explanation follows regarding a multifunction pen 5B of a second exemplary embodiment, while omitting explanation that would duplicate that of the first exemplary embodiment.

(1) External Appearance of Multifunction Pen 5B

Figure 6A:
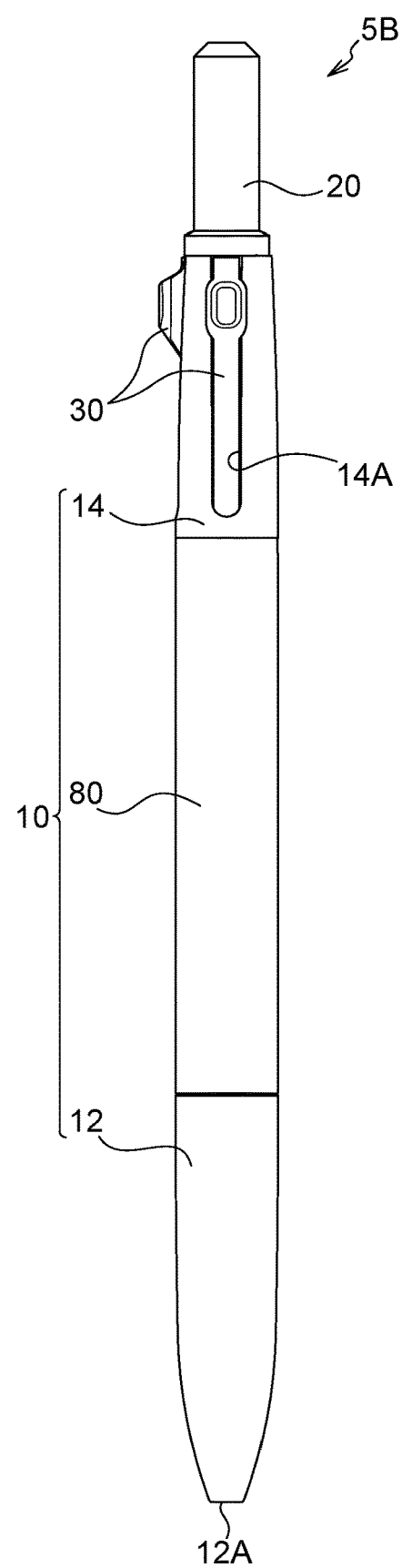
FIG. 6A is a side view illustrating a safe-kept state of a multifunction pen of a second exemplary embodiment.
Figure 6B:
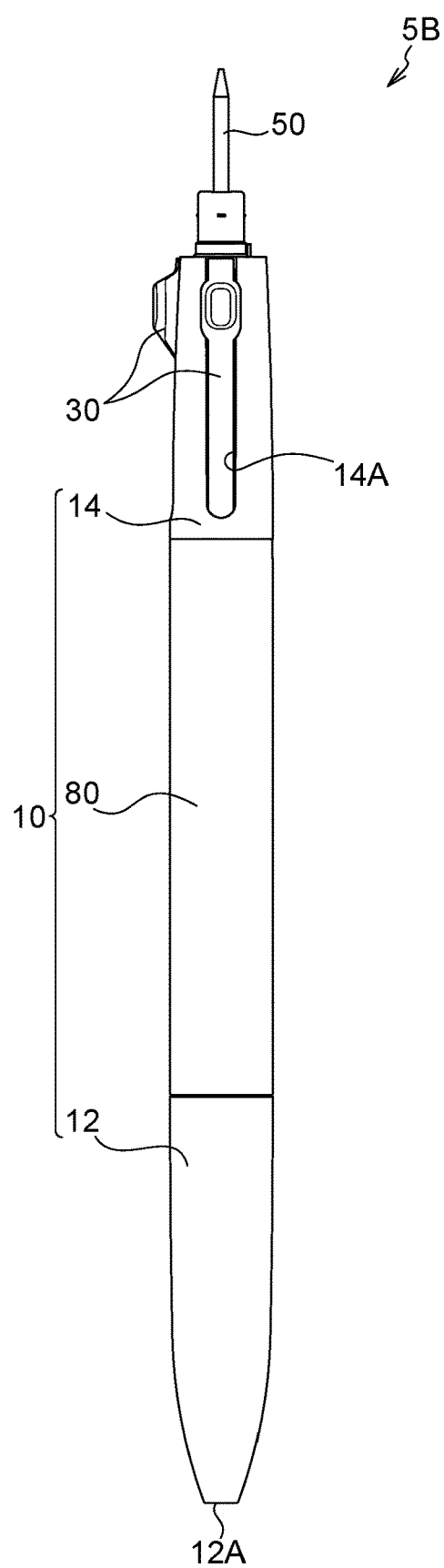
FIG. 6B is a side view illustrating an in-use state of a multifunction pen of the second exemplary embodiment.

The multifunction pen 5B according to the second exemplary embodiment has the external appearance illustrated in FIG. 6A and FIG. 6B. FIG. 6A illustrates a safe-kept state, and FIG. 6B illustrates an in-use state. In the second exemplary embodiment, the cap 20 is capable of being fitted onto and removed from the rear shaft 14, and is fitted onto or removed therefrom to switch between the safe-kept state and the in-use state, similarly to in the first exemplary embodiment.

Figure 8:
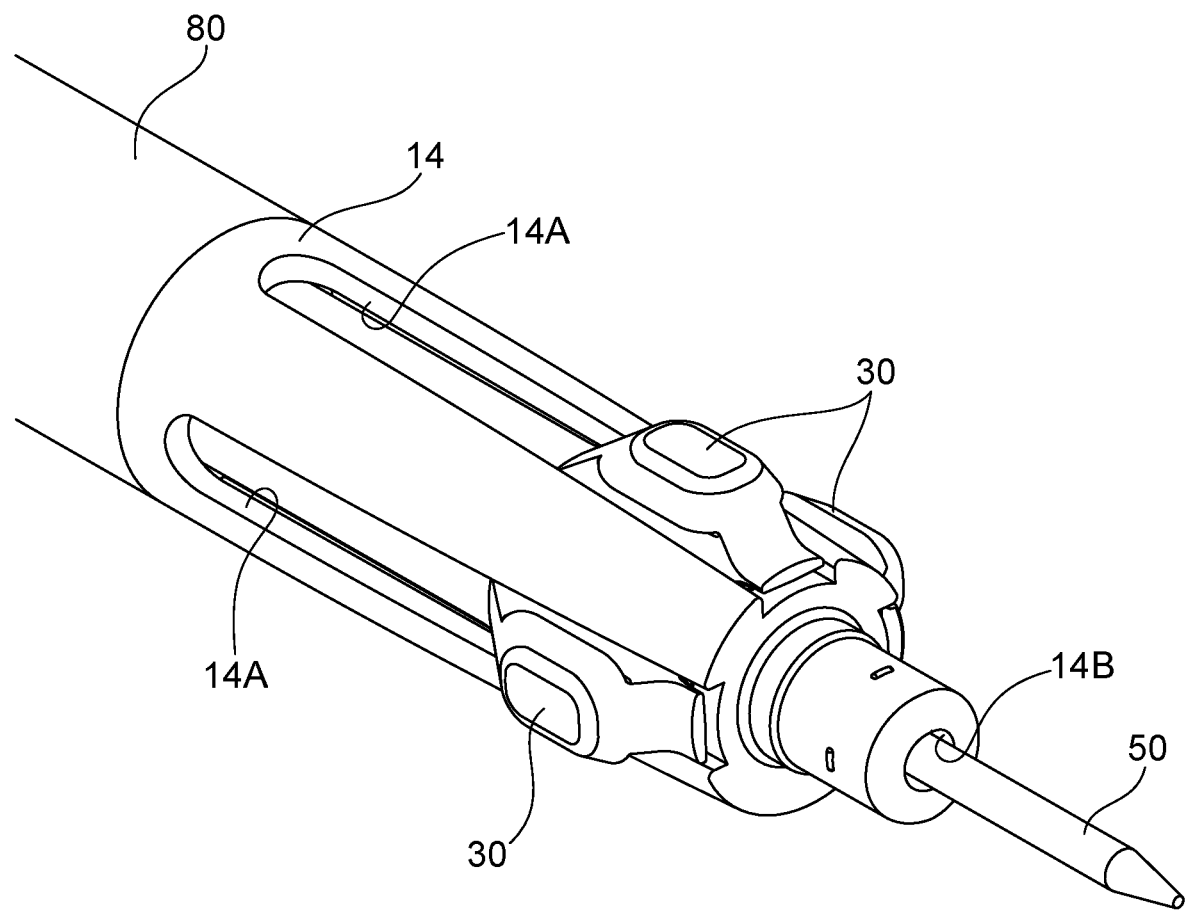
FIG. 8 is a perspective view illustrating a rear end side of a shaft tube of the second exemplary embodiment.

As illustrated in FIG. 8, three window holes 14A are formed in a rear end side of the rear shaft 14. Three knock rods 30 fitted to the rear of the writing refills 40 are exposed through the respective window holes 14A. A single electromagnetic induction refill 50 is exposed through a rear end opening 14B formed in a rear end of the rear shaft 14. Namely, in the second exemplary embodiment a total of four refills are provided, namely the three writing refills 40 and the single electromagnetic induction refill 50. This differs from the first exemplary embodiment in which a total of three refills are provided, namely the two writing refills 40 and the single electromagnetic induction refill 50.

As illustrated in FIG. 6A and FIG. 6B, FIG. 7A and FIG. 7B, and FIG. 8, the shaft tube 10 of the second exemplary embodiment includes a central shaft 80 forming a surface between the tip shaft 12 and the rear shaft 14.

(2) Interior of Multifunction Pen 5B

Figure 7A:
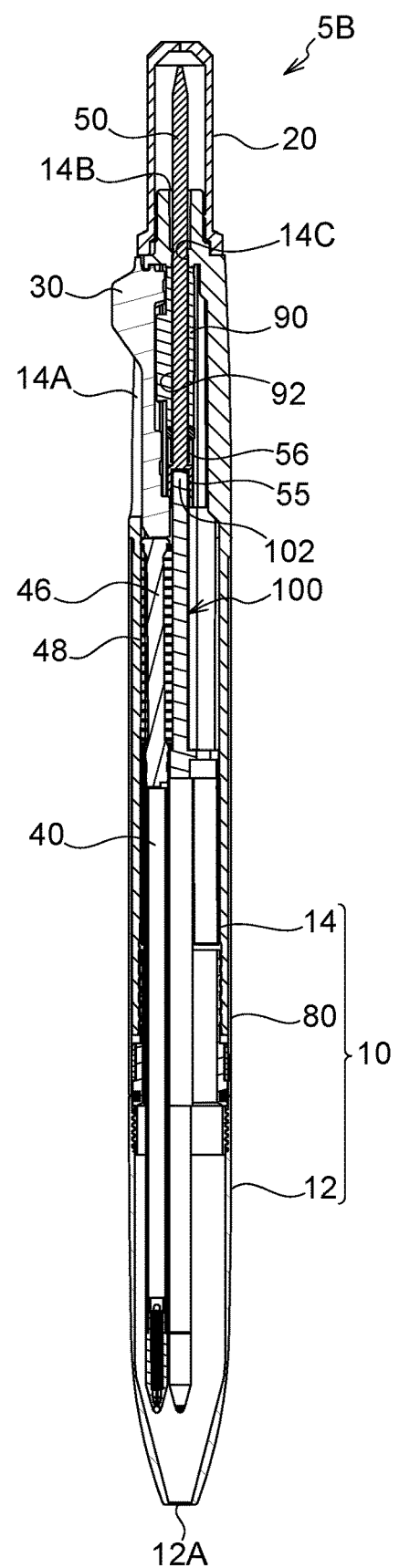
FIG. 7A is a side view cross-section illustrating a safe-kept state of a multifunction pen of the second exemplary embodiment.
Figure 7B:
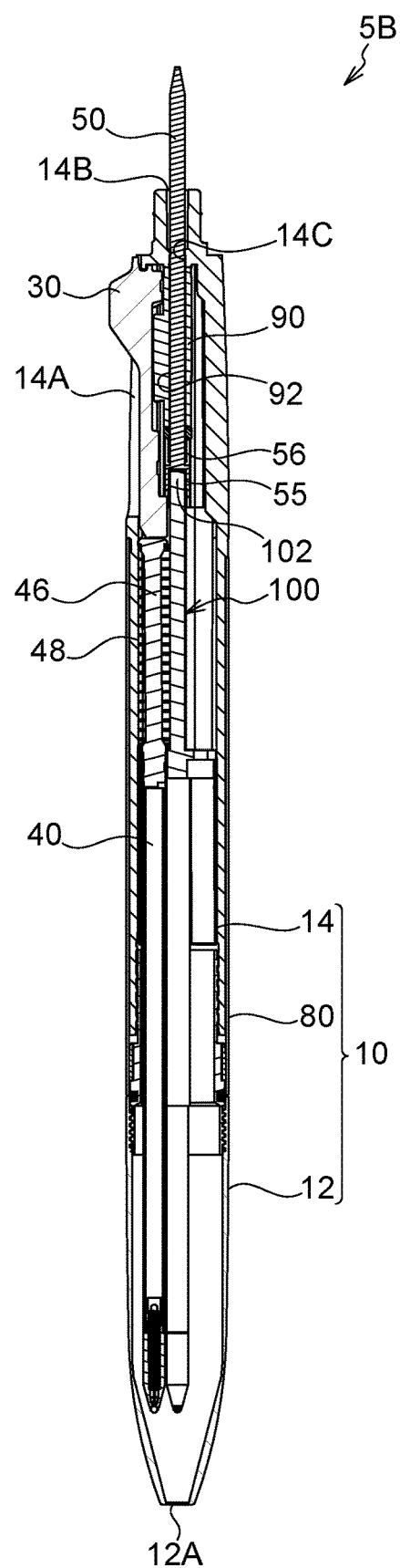
FIG. 7B is a side view cross-section illustrating an in-use state of a multifunction pen of the second exemplary embodiment.

FIG. 7A and FIG. 7B are cross-sections corresponding to the multifunction pen 5B illustrated in FIG. 6A and FIG. 6B.

As illustrated in FIG. 7A and FIG. 7B, rod shaped refill breeches 46 connecting rear ends of the writing refills 40 and tip-side ends of the knock rods 30 together are disposed in the internal space of the rear shaft 14. A spring 48 is fitted around an outer periphery of each of the refill breeches 46.

A spacer 100 is also disposed in the internal space of the rear shaft 14 to guide the refill breeches 46 along the axial direction. The spacer 100 guides the rear end sides of the three inserted writing refills 40 along the axial direction, and retains the refill breeches 46 around which the springs 48 are fitted so as to be capable of moving toward the front and rear. Note that a connection portion 102 employed to connect the spacer 100 to the electromagnetic induction refill 50 is provided at the rear end of the spacer 100.

A rotating cam 90 capable of rotating in the internal space and capable of reciprocal movement toward the front and rear is disposed in the internal space of the rear shaft 14 further toward the rear end side than the spacer 100. The rotating cam 90 is formed with a through hole 92 penetrating the rotating cam 90 in the axial direction.

A support hole 14C that supports a tip end side of the electromagnetic induction refill 50 is formed in the internal space of the rear shaft 14 further toward the rear end side than the rotating cam 90.

Note that part of a lower face of a circular column is hollowed out along the axial direction toward an upper face of the circular column at a rear end side of the electromagnetic induction refill 50 of the second exemplary embodiment. This hollowed out portion configures a recess 55 that fits together with the connection portion 102.

The rear end side of the electromagnetic induction refill 50 is connected to the spacer 100 by fitting the connection portion 102 together with the recess 55. A tip end side of the electromagnetic induction refill 50 is inserted into the support hole 14C to connect the tip end side to the rear shaft 14.

An axial direction intermediate portion of the electromagnetic induction refill 50 is inserted into the through hole 92 such that the rotating cam 90 is rotatably supported by the electromagnetic induction refill 50. A spring 56 that biases the rotating cam 90 toward the rear end side of the rear shaft 14 is fitted around the electromagnetic induction refill 50 slightly to a tip end side of the recess 55.

Note that in the second exemplary embodiment, the electromagnetic induction refill 50 rotatably supports the rotating cam 90, namely the electromagnetic induction refill 50 functions as a core member of a feed-out mechanism of the writing refills 40. However, there is no limitation to this configuration. For example, configuration may be made in which the electromagnetic induction refill 50 is covered by a hollow core rod, with the core rod functioning as the core member of the feed-out mechanism of the writing refills 40, and the core rod rotatably supporting the rotating cam 90.

(3) Other Characteristics

Figure 9:
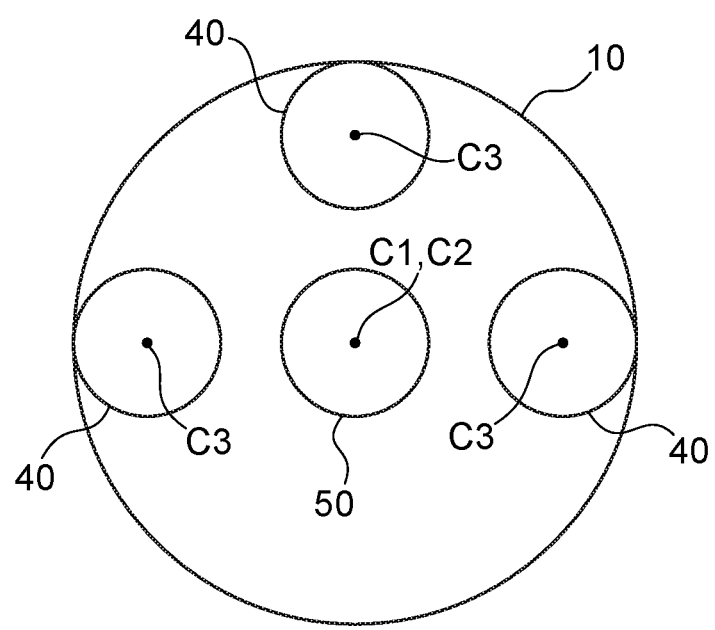
FIG. 9 is a schematic view illustrating axial centers of a rear end side of writing refills, an electromagnetic induction refill, and a shaft tube of the second exemplary embodiment.

In the second exemplary embodiment, similarly to in the first exemplary embodiment the axial centers of the rear end sides of the writing refills 40 and the axial center of the electromagnetic induction refill 50 are misaligned with each other. Specifically, the electromagnetic induction refill 50 is disposed in the internal space of the rear shaft 14 out of the way of the three writing refills 40 inserted into the spacer 100. More specifically, as illustrated in FIG. 9, an axial center C1 of the electromagnetic induction refill 50 is disposed at the radial direction center of the shaft tube 10 aligned with an axial center C2 of the shaft tube 10 at a position where the electromagnetic induction refill 50 is out of the way of the three writing refills 40. As illustrated in FIG. 9, due to this placement of the electromagnetic induction refill 50, the axial center C1 of the electromagnetic induction refill 50 and axial centers C3 of the rear end sides of the writing refills 40 are misaligned with each other.

(4) Operation

Next, explanation follows regarding operation of the second exemplary embodiment, specifically the method for using the respective refills.

The rotating cam feed-out mechanism employing the rotating cam 90 is employed as the feed-out mechanism of the writing refills 40 of the second exemplary embodiment. The ballpoint pen tip 44 of the corresponding writing refill 40 is caused to protrude from the tip end opening 12A by rotation of the rotating cam 90 in the radial direction accompanying movement of the corresponding knock rod 30 toward the tip end side.

In order to use the electromagnetic induction refill 50, first, the cap 20 is removed from the rear shaft 14 in order to adopt the in-use state. In the in-use state, text and the like can be written to the input device by tracking the electromagnetic induction refill 50 across the input screen of the input device.

(5) Advantageous Effects

In the second exemplary embodiment, the electromagnetic induction refill 50 is disposed at the axial center of the shaft tube 10. Specifically, as illustrated in FIG. 9, in the second exemplary embodiment the axial center C1 of the electromagnetic induction refill 50 and the axial center C2 of the shaft tube 10 are aligned with each other. The axial center C1 and the axial center C2 extend along a single straight line. The second exemplary embodiment thus differs from a configuration in which the axial center of the electromagnetic induction refill 50 is not disposed in a single straight line (referred to hereafter as Comparative Configuration 3), such that the electromagnetic induction refill 50 is not used in a bent state. Accordingly, in the second exemplary embodiment, the load imparted to the electromagnetic induction refill 50 during use can be reduced in comparison to in Comparative Configuration 3, enabling the same electromagnetic induction refill 50 to be used for longer. Moreover, the electromagnetic induction refill 50 is easy to replace.

Third Exemplary Embodiment

Explanation follows regarding a multifunction pen 5C of a third exemplary embodiment, while omitting explanation that would duplicate that of the first or second exemplary embodiment.

(1) External Appearance of Multifunction Pen 5C

Figure 10A:
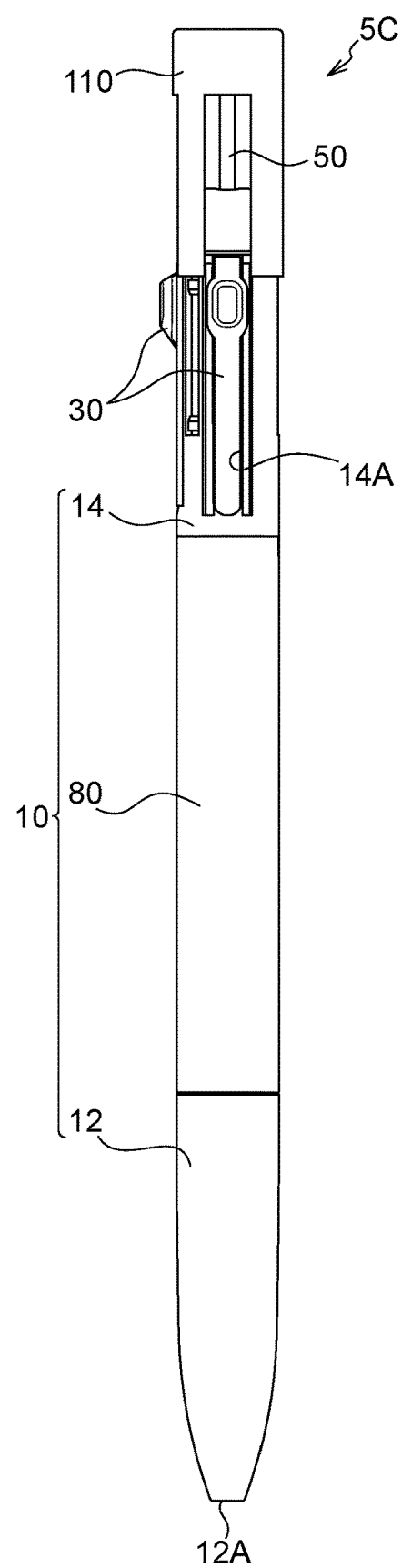
FIG. 10A is a side view illustrating a safe-kept state of a multifunction pen of a third exemplary embodiment.
Figure 10B:
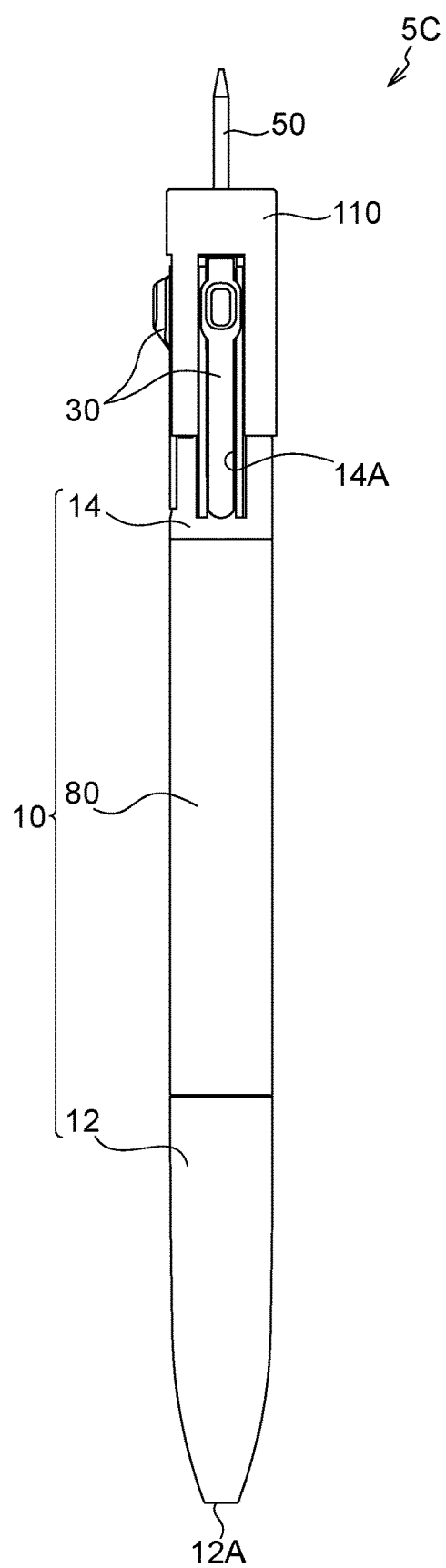
FIG. 10B is a side view illustrating an in-use state of a multifunction pen of the third exemplary embodiment.

The multifunction pen 5C according to the third exemplary embodiment has the external appearance illustrated in FIG. 10A and FIG. 10B. FIG. 10A illustrates a safe-kept state, and FIG. 10B illustrates an in-use state. In the third exemplary embodiment, a sliding cover 110 is moved toward the front and rear in order to switch between the safe-kept state and the in-use state, unlike in the first and second exemplary embodiments in which the cap 20 is fitted or removed in order to switch between the safe-kept state and the in-use state.

Note that since the structure of the multifunction pen 5C of the third exemplary embodiment is basically similar to that of the second exemplary embodiment, explanation regarding common portions will be omitted, and explanation given only regarding points that differ.

Figure 11A:
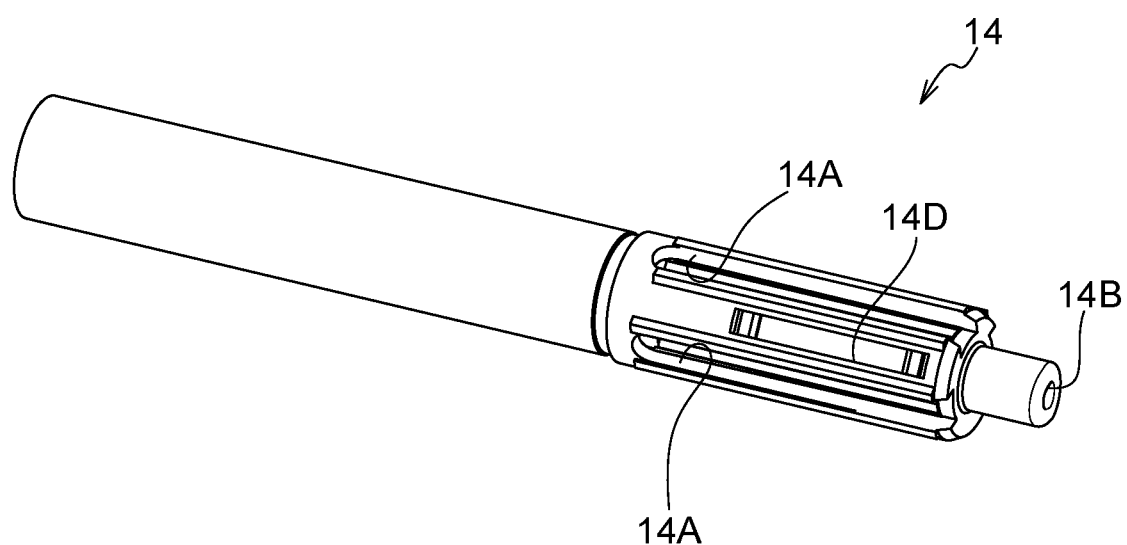
FIG. 11A is a perspective view illustrating a rear shaft of the third exemplary embodiment.
Figure 11B:
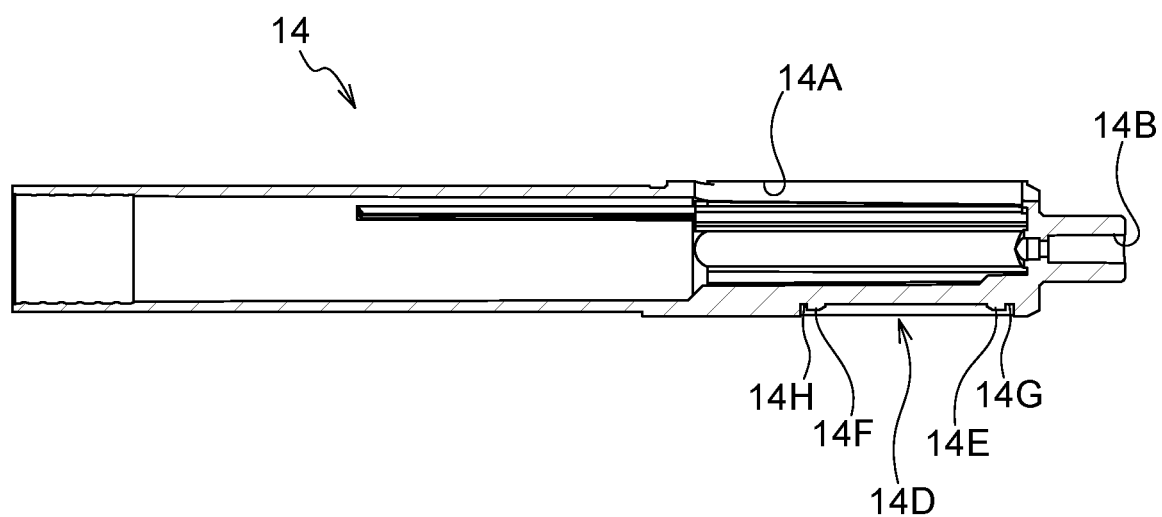
FIG. 11B is a side view cross-section illustrating a rear shaft of the third exemplary embodiment.

Note that the rear shaft 14 of the third exemplary embodiment has the external appearance illustrated in FIG. 11A. FIG. 11B is a cross-section corresponding to the rear shaft 14 illustrated in FIG. 11A.

As illustrated in FIG. 11A and FIG. 11B, a movement groove 14D is formed extending along the axial direction between two window holes 14A at a rear end side of the rear shaft 14 to allow the sliding cover 110 to move. As illustrated in FIG. 11B, a projection 14E is provided projecting toward the outside immediately ahead of a rear end of the movement groove 14D, and a projection 14F is provided projecting toward the outside immediately behind a tip-side end of the movement groove 14D. An engagement groove 14G to engage with a projection 114, described later, of the sliding cover 110 is formed between the projection 14E and the rear end of the movement groove 14D, and an engagement groove 14H to engage with the projection 114 is formed between the projection 14F and the tip end of the movement groove 14D.

Figure 12A:
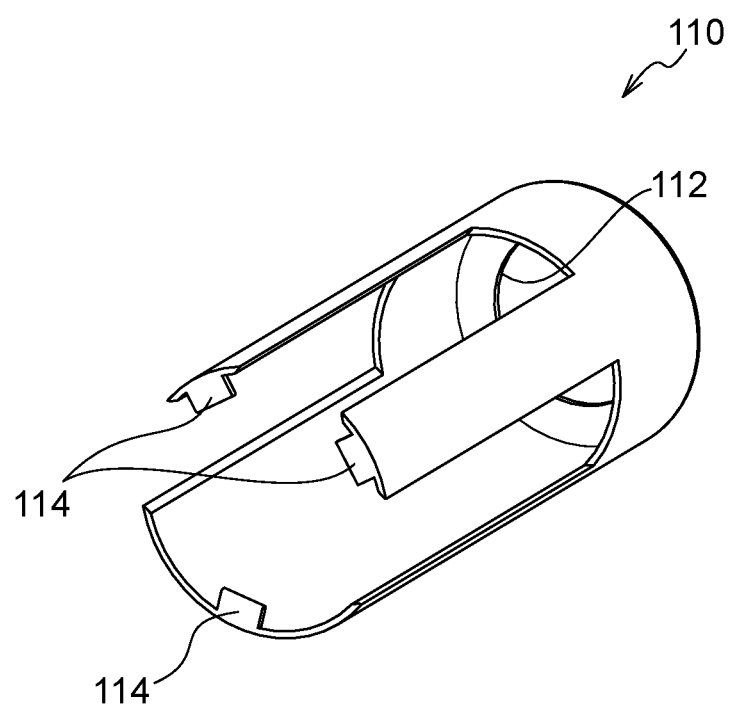
FIG. 12A is a perspective view illustrating a sliding cover of the third exemplary embodiment.
Figure 12B:
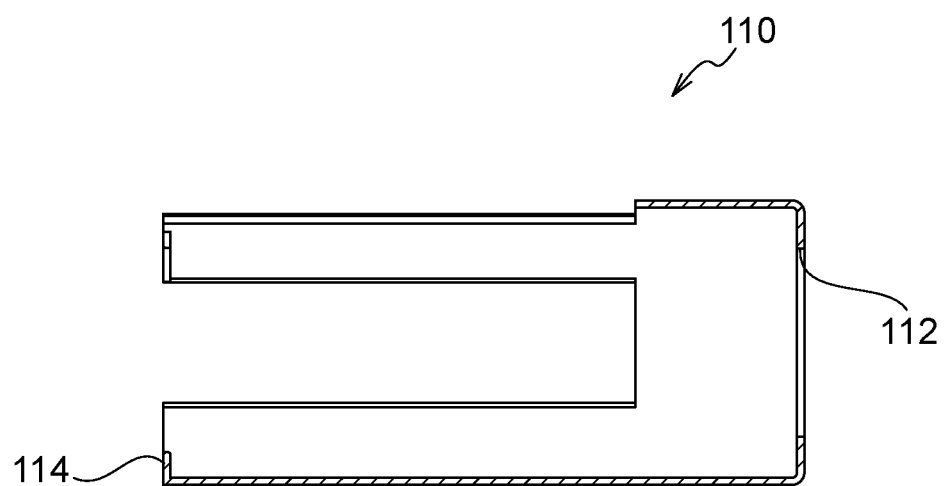
FIG. 12B is a side view cross-section illustrating a sliding cover of the third exemplary embodiment.

The sliding cover 110 has the external appearance illustrated in FIG. 12A. FIG. 12B is a cross-section corresponding to the sliding cover 110 illustrated in FIG. 12A.

As illustrated in FIG. 12A and FIG. 12B, the projections 114 are provided projecting toward the inside at a tip-side end of the sliding cover 110. An exposing opening 112 is formed to expose the electromagnetic induction refill 50 at a rear end of the sliding cover 110.

Figure 13A:
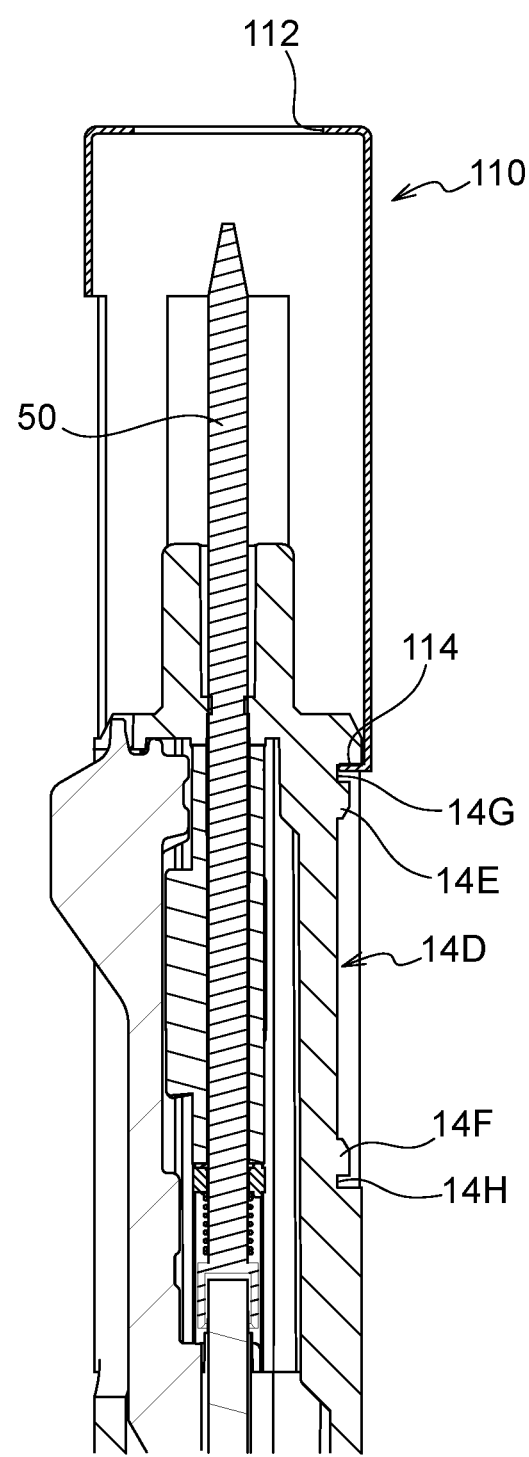
FIG. 13A is an enlarged side view cross-section illustrating a safe-kept state at a rear end side of a multifunction pen of the third exemplary embodiment.
Figure 13B:
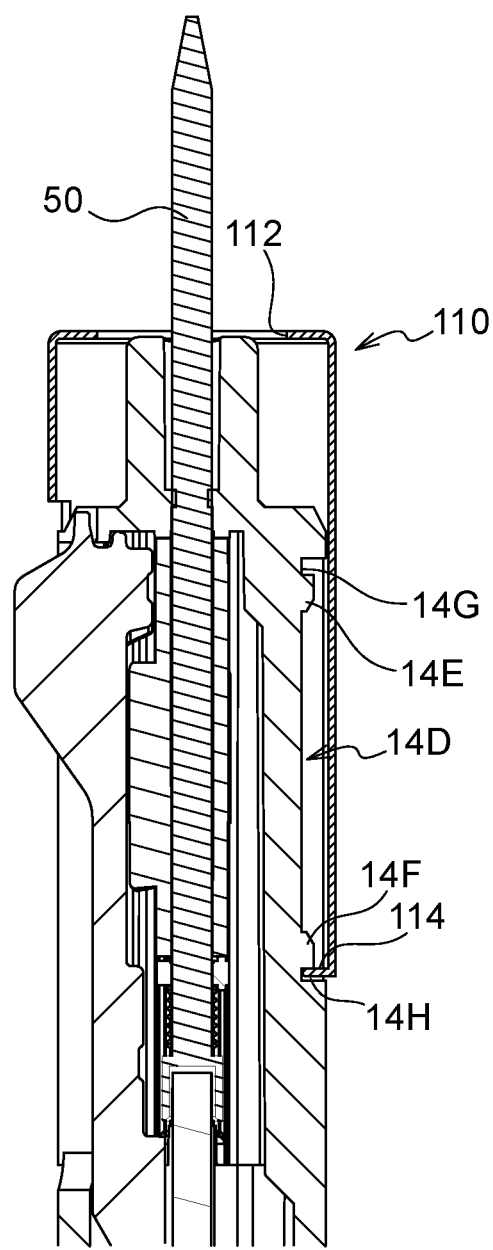
FIG. 13B is an enlarged side view cross-section illustrating an in-use state at a rear end side of a multifunction pen of the third exemplary embodiment.

In the safe-kept state illustrated in FIG. 13A, the projections 114 engage with the engagement grooves 14G and in the in-use state illustrated in FIG. 13B, the projections 114 engage with the engagement grooves 14H. In the safe-kept state in which the projections 114 and the engagement grooves 14G are engaged with each other, the electromagnetic induction refill 50 is covered by the sliding cover 110 (see FIG. 13A). Conversely, in the in-use state in which the projection 114 and the engagement grooves 14H are engaged with each other, the electromagnetic induction refill 50 is exposed through the exposing opening 112 of the sliding cover 110 (see FIG. 13B).

(2) Operation

Explanation follows regarding operation of the third exemplary embodiment, specifically the method for using the respective refills. Note that the method for using the writing refills 40 is similar to that of the second exemplary embodiment, and so explanation thereof is omitted.

In order to use the electromagnetic induction refill 50, first, in the safe-kept state the sliding cover 110 is pushed toward the tip end side. This pushing causes the projections 114 engaged with the engagement grooves 14G to ride over the projections 14E, thus releasing the engagement between the engagement grooves 14G and the projections 114. In a state in which engagement between the engagement grooves 14G and the projections 114 has been released, the sliding cover 110 is pushed further toward the tip end side, thereby moving the sliding cover 110 toward the tip end side along the movement grooves 14D. When the sliding cover 110 reaches the vicinity of the tip-side end of the movement grooves 14D, the projections 114 contact the projections 14F. In a state in which the projections 114 have contacted the projections 14F, the sliding cover 110 is pushed further toward the tip end side such that the projections 114 ride over the projections 14F and the engagement grooves 14H and the projections 114 engage with each other. The Multifunction Pen 5C of the third exemplary embodiment is thus switched from the safe-kept state to the in-use state. In the in-use state, text and the like can be written to the input device by tracking the electromagnetic induction refill 50 across the input screen of the input device.

In order to switch from the in-use state to the safe-kept state, the above operation is performed toward the opposite side (the rear end side). Namely, in the in-use state, the sliding cover 110 is pulled toward the rear end side, thus releasing the engagement between the engagement grooves 14H and the projections 114, and on reaching the vicinity of the rear end of the movement grooves 14D the projections 114 ride over the projections 14E such that the engagement grooves 14G and the projections 114 engage with each other. The multifunction pen 5C of the third exemplary embodiment is thus switched from the in-use state to the safe-kept state.

Fourth Exemplary Embodiment

Explanation follows regarding a multifunction pen 5D of a fourth exemplary embodiment, while omitting explanation that would duplicate that of the first, second, or third exemplary embodiments.

(1) External Appearance of Multifunction Pen 5D

Figure 14A:
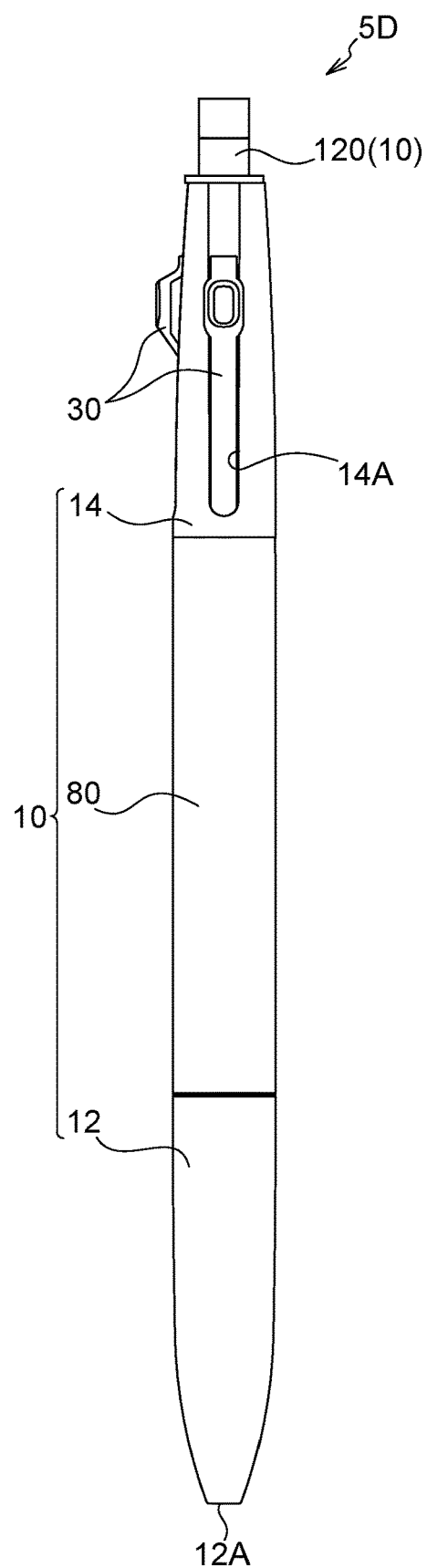
FIG. 14A is a side view illustrating a safe-kept state of a multifunction pen of a fourth exemplary embodiment.
Figure 14B:
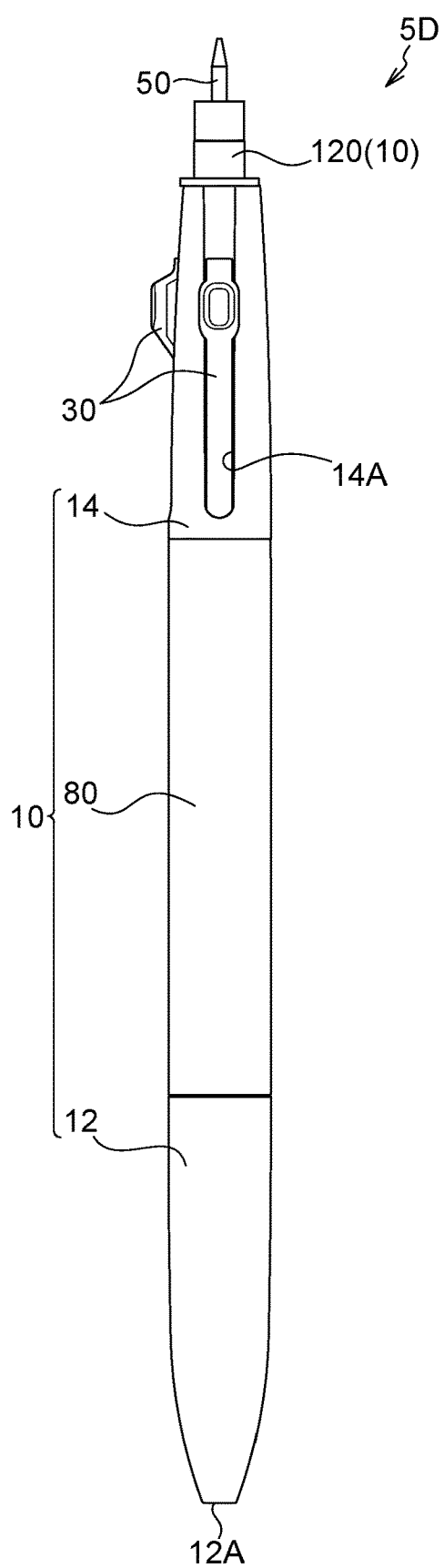
FIG. 14B is a side view illustrating an in-use state of a multifunction pen of the fourth exemplary embodiment.

The multifunction pen 5D according to the fourth exemplary embodiment has the external appearance illustrated in FIG. 14A and FIG. 14B. FIG. 14A illustrates a safe-kept state, and FIG. 14B illustrates an in-use state. In the fourth exemplary embodiment, a rotating mechanism 120, described later, is operated to switch between the safe-kept state and the in-use state, unlike in the configuration of the first, second, and third exemplary embodiments.

Note that since the structure of the multifunction pen 5D of the fourth exemplary embodiment is basically similar to that of the second and third exemplary embodiments, explanation regarding common portions will be omitted, and explanation given only regarding points that differ.

Figure 15A:
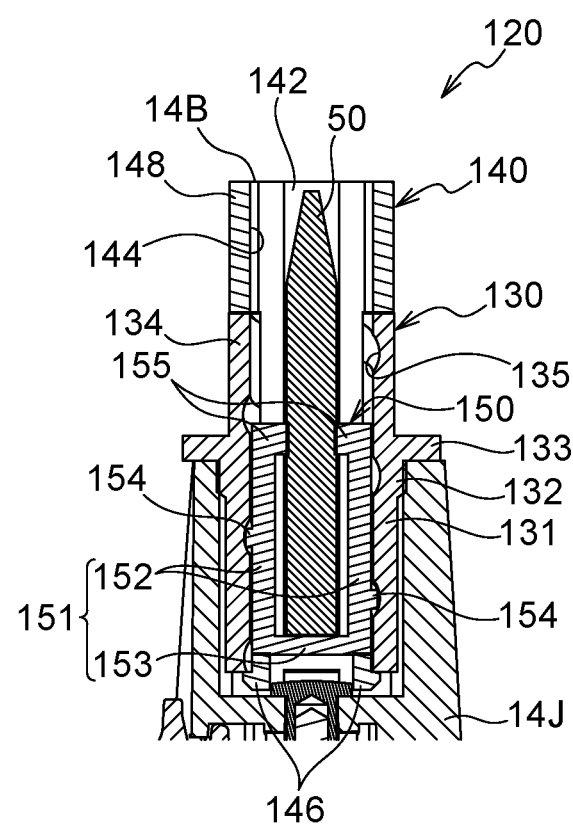
FIG. 15A is an enlarged side view cross-section illustrating a safe-kept state at a rear end side of a multifunction pen of the fourth exemplary embodiment.
Figure 15B:
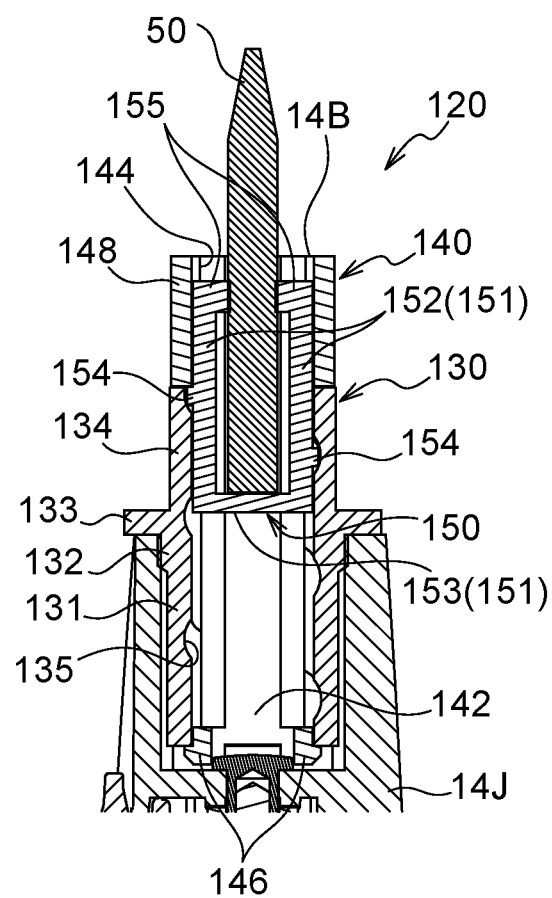
FIG. 15B is an enlarged side view cross-section illustrating an in-use state at a rear end side of a multifunction pen of the fourth exemplary embodiment.

FIG. 15A and FIG. 15B are enlarged cross-sections of the rear end portion corresponding to the multifunction pen 5D illustrated in FIG. 14A and FIG. 14B.

As illustrated in FIG. 15A and FIG. 15B, the rotating mechanism 120 includes a base 130, a rotation body 140, and a moving body 150. The rotating mechanism 120 is fixed to a rear shaft rear end portion 14J configuring a rear end side portion of the rear shaft 14 such that the rotating mechanism 120 configures part of the shaft tube 10.

Figure 16A:
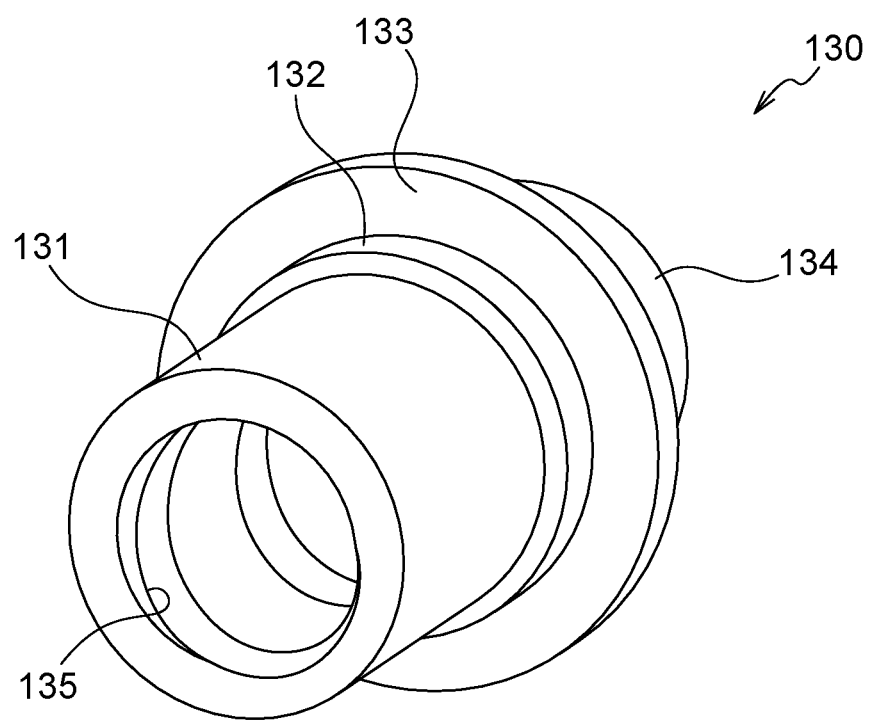
FIG. 16A is a perspective view illustrating a base of the fourth exemplary embodiment.
Figure 16B:
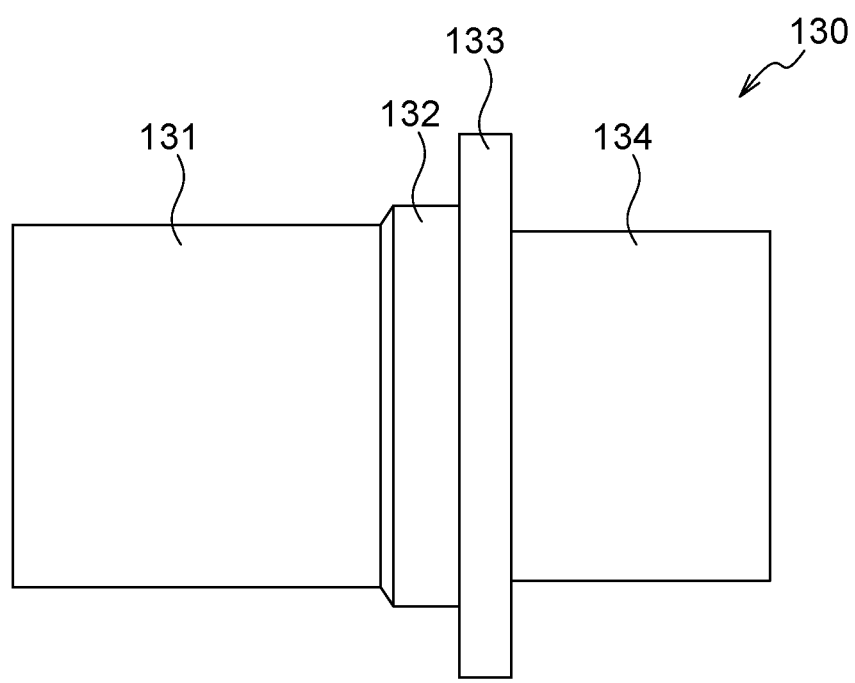
FIG. 16B is a side view illustrating a base of the fourth exemplary embodiment.

The base 130 of the rotating mechanism 120 is a member that is fixed to the rear shaft rear end portion 14J. Namely, the base 130 is fixed to the rear shaft rear end portion 14J and does not move, and so does not rotate accompanying rotation of a rotating portion 148 of the rotation body 140, described later. As illustrated in FIG. 16A, the base 130 is a hollow member with an internal cavity, and as illustrated in FIG. 16B, the rotation body 140 includes an insertion portion 131, a press-fit portion 132, a collar 133, and a coupling portion 134 in sequence from the tip end side.

The insertion portion 131 of the base 130 is a circular cylinder shaped portion inserted into the rear shaft rear end portion 14J. The external diameter of the insertion portion 131 is smaller than the internal diameter of the rear shaft rear end portion 14J.

The press-fit portion 132 of the base 130 is a ring shaped portion that is press-fitted into the rear shaft rear end portion 14J. The external diameter of the press-fit portion 132 is slightly smaller than the internal diameter of the rear shaft rear end portion 14J. Namely, the insertion portion 131 is inserted into the rear shaft rear end portion 14J, after which the press-fit portion 132 is press-fitted into the rear shaft rear end portion 14J, thereby fixing the base 130 to the rear shaft rear end portion 14J.

The collar 133 of the base 130 is a ring shaped portion that halts the insertion of the base 130 into the rear shaft rear end portion 14J. The external diameter of the collar 133 is larger than the internal diameter of the rear shaft rear end portion 14J. Namely, the base 130 is inserted into the rear shaft rear end portion 14J until the collar 133 makes contact with the rear shaft rear end portion 14J.

The coupling portion 134 of the base 130 is a circular cylinder shaped portion coupled to the rotating portion 148 of the rotation body 140, described later.

As illustrated in FIG. 16A, an inner peripheral groove 135 is formed in a spiral pattern from a tip-side end to a rear end of an inner peripheral face of the base 130.

Figure 17A:
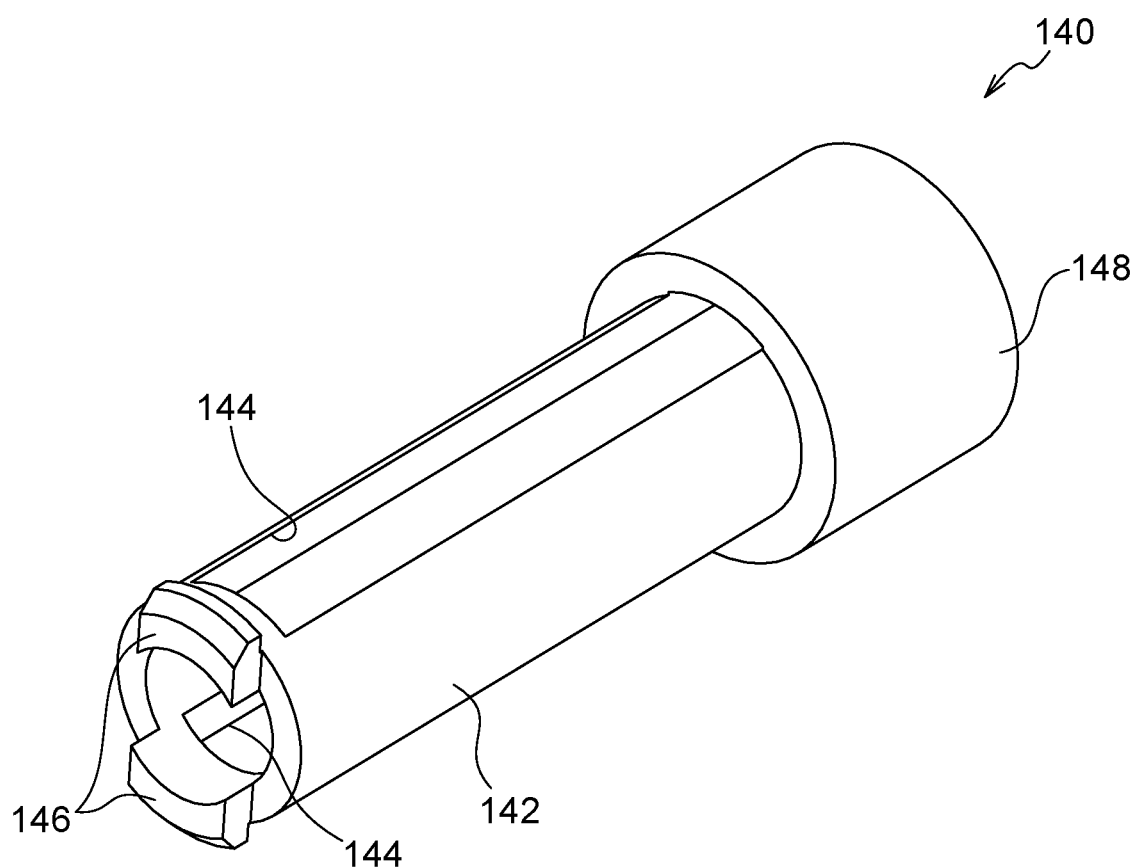
FIG. 17A is a perspective view illustrating a rotation body of the fourth exemplary embodiment.
Figure 17B:
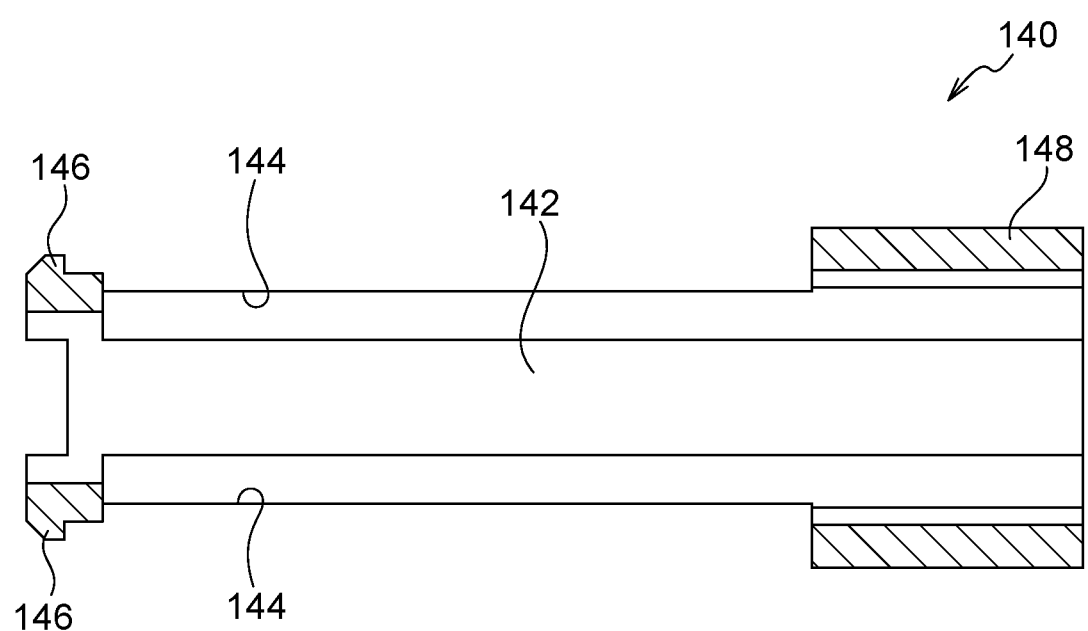
FIG. 17B is a side view cross-section illustrating a rotation body of the fourth exemplary embodiment.

The rotation body 140 has a substantially circular cylinder shape, and is a member of the rotating mechanism 120 that rotates in a circumferential direction so as to move the moving body 150, described later, toward the front and rear. As illustrated in FIG. 17A and FIG. 17B, the rotation body 140 is a hollow member with an internal cavity, and includes a circular cylinder portion 142 and the rotating portion 148.

The circular cylinder portion 142 of the rotation body 140 is a portion that has a circular cylinder shape extending along the axial direction, and is inserted into the base 130. The external diameter of the circular cylinder portion 142 is smaller than the internal diameter of the base 130. An outer peripheral face of the circular cylinder portion 142 includes two tube holes 144 open along the axial direction, and projections 146 projecting toward the outside from a tip-side end of the circular cylinder portion 142. The projections 146 engage with a tip-side end face of the insertion portion 131 when the circular cylinder portion 142 is inserted into the base 130, thereby functioning as a stopper to suppress the circular cylinder portion 142 from coming out of the base 130.

The rotating portion 148 of the rotation body 140 is a circular cylinder shaped portion that covers the outer peripheral face of the rear end side of the circular cylinder portion 142. The external diameter of the rotating portion 148 is substantially equal to the external diameter of the coupling portion 134. Namely, the rotating portion 148 is coupled to the coupling portion 134 when the circular cylinder portion 142 is inserted into the base 130.

Figure 18A:
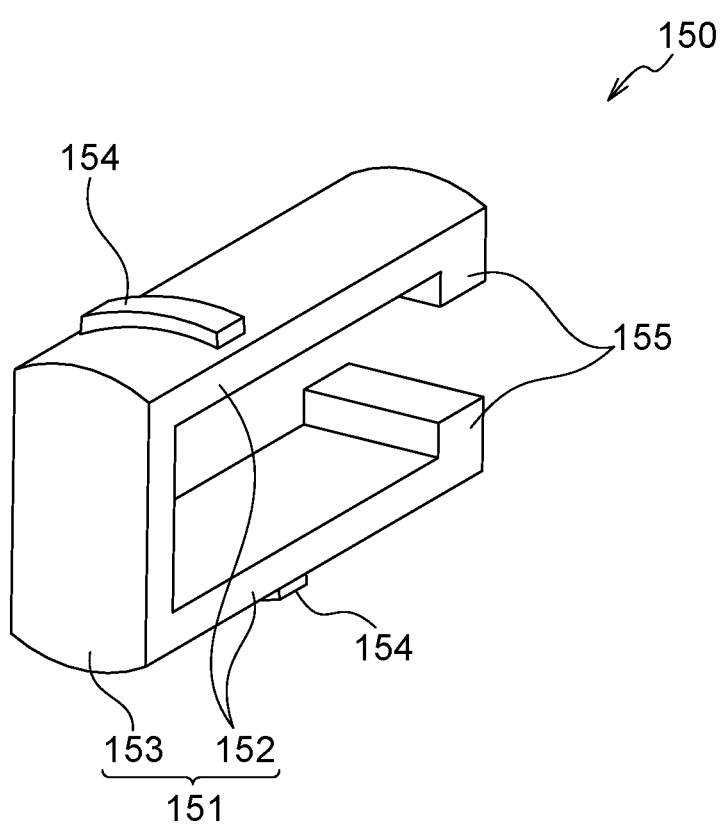
FIG. 18A is a perspective view illustrating a moving body of the fourth exemplary embodiment.
Figure 18B:
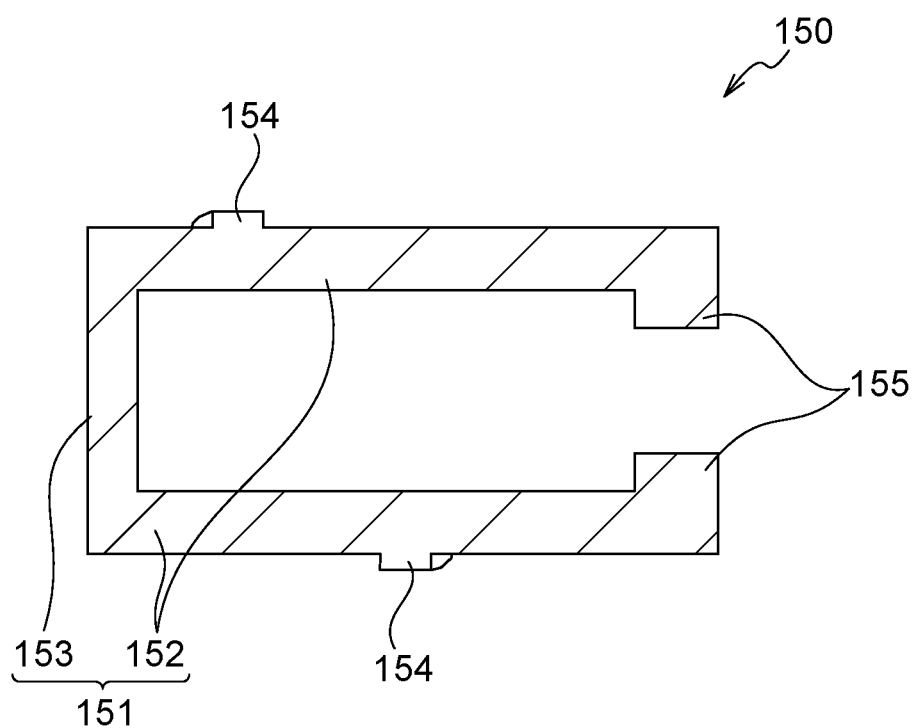
FIG. 18B is a side view cross-section illustrating a moving body of the fourth exemplary embodiment.

The moving body 150 of the rotating mechanism 120 is a member that moves toward the front and rear accompanying rotation of the rotation body 140. As illustrated in FIG. 18A and FIG. 18B, the moving body 150 includes a plate section 151.

The plate section 151 includes two long plate portions 152 on a long side, and a single short plate portion 153 on a short side to link together one ends of the long plate portions 152. The length of the single short plate portion 153 is slightly shorter than the internal diameters of the rotation body 140 and the base 130.

The two long plate portions 152 are each provided with a projection 154 projecting toward the outer side from an outer face of the corresponding long plate portion 152. The shape of the projections 154 is a shape corresponding to the spiral pattern of the inner peripheral groove 135. The projections 154 are also projections corresponding to the tube holes 144 in the rotation body 140, and project out through the tube holes 144 when the moving body 150 is fitted to the rotation body 140 (circular cylinder portion 142). The projections 154 engage with the inner peripheral groove 135 when the rotation body 140 (circular cylinder portion 142) fitted with the moving body 150 is inserted into the base 130. As will be described in more detail later, the rotating portion 148 is rotated in the circumferential direction in an engaged state of the projections 154 and the inner peripheral groove 135, thus moving the moving body 150 toward the front and rear.

Moreover, projections are provided projecting toward the inside at other ends of the two long plate portions 152 on the opposite side to the one ends (end portions on the single short plate portion 153 side). These two projections form a clamp 155 that clamps the electromagnetic induction refill 50. The width of the clamp 155 (length between the two projections) is slightly smaller than the external diameter of the electromagnetic induction refill 50. Namely, the electromagnetic induction refill 50 is fixed to the moving body 150 by being press-fitted into the clamp 155.

(2) Operation

Explanation follows regarding operation of the fourth exemplary embodiment, specifically a sequence in which the rotating mechanism 120 is assembled and attached to the rear shaft rear end portion 14J. Explanation is also given regarding a sequence in which the rotating mechanism 120 is operated to cause the electromagnetic induction refill 50 to emerge through the rear end opening 14B.

Explanation follows regarding an example of an assembly process of the rotating mechanism 120.

First, the electromagnetic induction refill 50 is press-fitted into the clamp 155 so as to clamp the electromagnetic induction refill 50 in the clamp 155 and thus fix the electromagnetic induction refill 50 and the moving body 150 together. Next, the moving body 150 to which the electromagnetic induction refill 50 has been fixed is fitted to the circular cylinder portion 142. Specifically, the moving body 150 is inserted toward the tip end side through the rotating portion 148, while aligning the projections 154 with the tube holes 144, such that the moving body 150 passes through the rotating portion 148 with the projections 154 elastically deformed toward the inside. The moving body 150 is thus fitted to the circular cylinder portion 142 in a state in which the projections 154 project out through the tube holes 144. Namely, the moving body 150 is fitted to the rotation body 140.

Next, the rotation body 140 to which the moving body 150 has been fitted is inserted into the base 130. Specifically, the circular cylinder portion 142 is inserted into the base 130 until the rotating portion 148 contacts the coupling portion 134, and the rotating portion 148 and the coupling portion 134 are coupled together with the projections 146 elastically deformed toward the inside. In the coupled state of the rotating portion 148 and the coupling portion 134, the tip-side end of the circular cylinder portion 142 is exposed from the tip-side end of the insertion portion 131, and the projections 146 engage with the tip-side end face of the insertion portion 131. In the coupled state of the rotating portion 148 and the coupling portion 134, the projections 154 and the inner peripheral groove 135 are engaged with each other. The rotation body 140 is fitted to the base 130 in the above manner.

The base 130 to which the rotation body 140 has been fitted is then inserted into the rear shaft rear end portion 14J. Specifically, the base 130 is inserted into the rear shaft rear end portion 14J from the insertion portion 131, and after the press-fit portion 132 has been press-fitted into the rear shaft rear end portion 14J, the base 130 is inserted further into the rear shaft rear end portion 14J until the collar 133 makes contact with the rear shaft rear end portion 14J. The base 130 is fitted to the rear shaft rear end portion 14J and the rotating mechanism 120 is fixed to the rear shaft rear end portion 14J in this manner.

Next, explanation follows regarding a sequence in which the rotating mechanism 120 is operated to cause the electromagnetic induction refill 50 to emerge through the rear end opening 14B. The following explanation assumes that the multifunction pen 5D is in the safe-kept state illustrated in FIG. 15A.

When the rotating portion 148 is rotated toward one circumferential direction side in the safe-kept state, the moving body 150 including the projections 154 engaged with the inner peripheral groove 135 moves toward the rear end side following the spiral pattern of the inner peripheral groove 135 accompanying the rotation of the rotation body 140 toward the one circumferential direction side. The electromagnetic induction refill 50 fixed to the moving body 150 is thus exposed through the rear end opening 14B, thereby switching from the safe-kept state to the in-use state (see FIG. 15B).

Conversely, when in the in-use state, rotating the rotating portion 148 toward the opposite side to the one side described above causes the moving body 150 including the projections 154 engaged with the inner peripheral groove 135 to move toward the tip end side following the spiral pattern of the inner peripheral groove 135 accompanying the rotation of the rotation body 140 toward the opposite side to the one circumferential direction side. The electromagnetic induction refill 50 that is fixed to the moving body 150 is thus housed in the rotating mechanism 120, thereby switching from the in-use state to the safe-kept state (see FIG. 15A).

Fifth Exemplary Embodiment

Explanation follows regarding a multifunction pen 5E of a fifth exemplary embodiment, while omitting explanation that would duplicate that of the first, second, third, or fourth exemplary embodiments.

(1) External Appearance of Multifunction Pen 5E

Figure 19A:
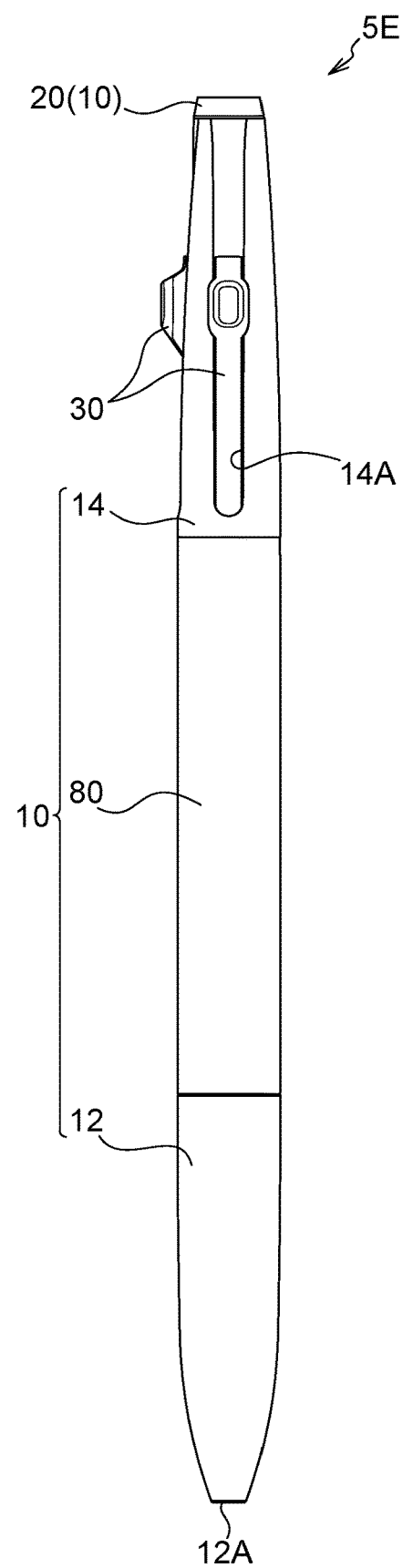
FIG. 19A is a side view illustrating a safe-kept state of a multifunction pen of a fifth exemplary embodiment.
Figure 19B:
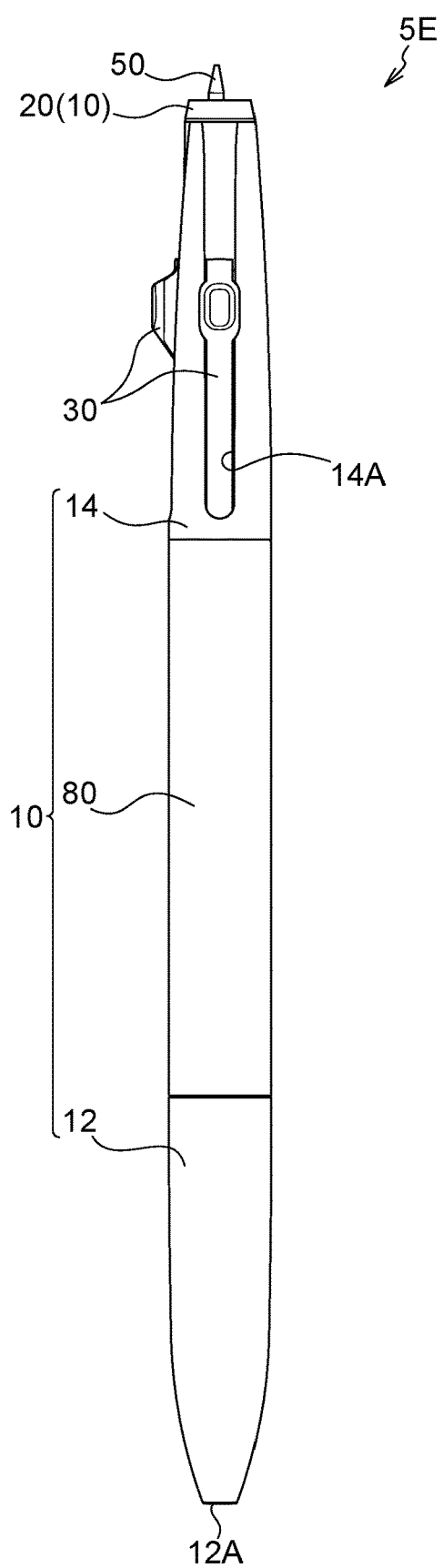
FIG. 19B is a side view illustrating an in-use state of a multifunction pen of the fifth exemplary embodiment.

The multifunction pen 5E according to the fifth exemplary embodiment has the external appearance illustrated in FIG. 19A and FIG. 19B. FIG. 19A illustrates a safe-kept state, and FIG. 19B illustrates an in-use state. In the fifth exemplary embodiment, a projecting mechanism 160, described later, is operated to switch between the safe-kept state and the in-use state, unlike in the first, second, third, and fourth exemplary embodiments.

Note that since the structure of the multifunction pen 5E of the fifth exemplary embodiment is basically similar to that of the second, third, and fourth exemplary embodiments, explanation regarding common portions will be omitted, and explanation given only regarding points that differ.

Figure 20A:
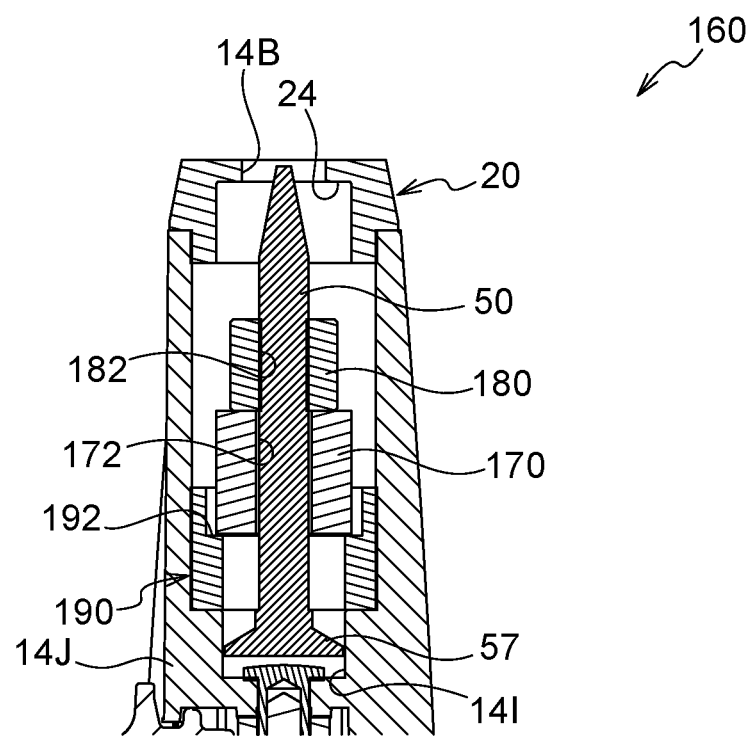
FIG. 20A is an enlarged side view cross-section illustrating a safe-kept state at a rear end side of a multifunction pen of the fifth exemplary embodiment.
Figure 20B:
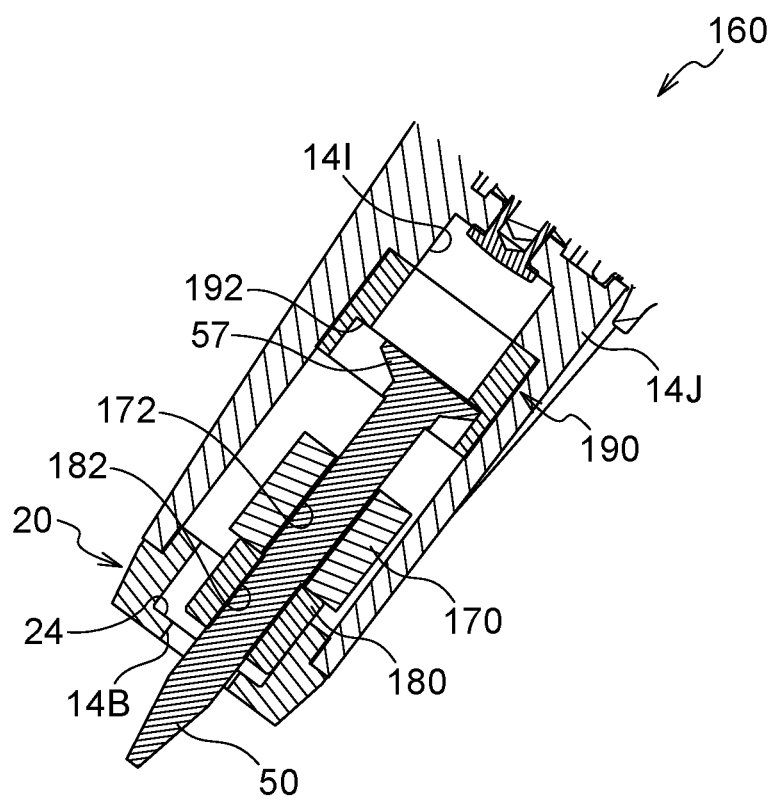
FIG. 20B is an enlarged side view cross-section illustrating an in-use state at a rear end side of a multifunction pen of the fifth exemplary embodiment.

FIG. 20A and FIG. 20B are enlarged cross-sections of the rear end portion corresponding to the multifunction pen 5E illustrated in FIG. 19A and FIG. 19B.

As illustrated in FIG. 20A and FIG. 20B, the projecting mechanism 160 includes a weight 170 a weight catcher 180, and a stopper 190 that are housed in the rear shaft rear end portion 14J, as well as a cap 20 fitted to a rear end of the rear shaft rear end portion 14J.

Figure 21:
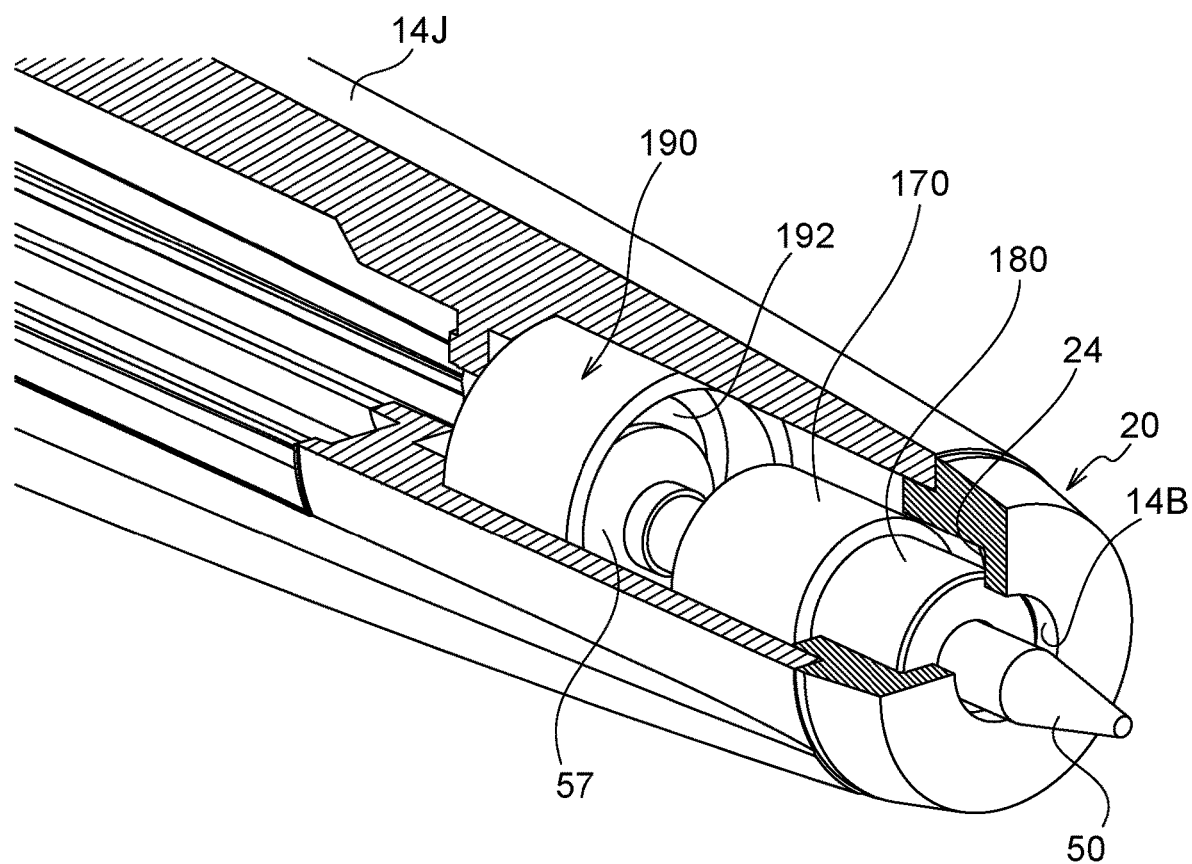
FIG. 21 is a perspective view (and partial cross-section) illustrating a rear end side of a shaft tube of the fifth exemplary embodiment.

As illustrated in FIG. 20A, FIG. 20B, and FIG. 21, the weight 170 of the projecting mechanism 160 is a weighted object, and is formed in a circular cylinder shape. As illustrated in FIG. 20A, FIG. 20B, and FIG. 21, the weight catcher 180 of the projecting mechanism 160 is a circular cylinder shaped member disposed at the rear end side of the weight 170 so as to contact the weight 170. The external diameter of the weight catcher 180 is smaller than the external diameter of the weight 170. The weight 170 may be formed with a beveled face at a rear end face side for the purpose of positioning.

As illustrated in FIG. 20A and FIG. 20B, the weight 170 is formed with a through hole 172 penetrating the weight 170 in its axial direction, and the weight catcher 180 is formed with a through hole 182 penetrating the weight catcher 180 in its axial direction. The diameter of the through hole 172 is larger than the external diameter of the electromagnetic induction refill 50. The weight 170 is thus capable of moving toward the front and rear over the electromagnetic induction refill 50 that is inserted through the through hole 172. The diameter of the through hole 182 is slightly smaller than the external diameter of the electromagnetic induction refill 50. Accordingly, the weight catcher 180 is fixed to the electromagnetic induction refill 50 by press-fitting the electromagnetic induction refill 50 into the through hole 182, such that the weight catcher 180 is not able to move toward the front and rear over the electromagnetic induction refill 50.

As illustrated in FIG. 20A, FIG. 20B, and FIG. 21, the stopper 190 of the projecting mechanism 160 is a circular cylinder shaped member, and contacts the weight 170 when the weight 170 drops toward the tip end side. The stopper 190 is provided with a stopper step 192 formed including a step toward the inside of the stopper 190 serving as a location that makes contact with the weight 170. The stopper 190 is disposed at the tip end side of the internal space of the rear shaft rear end portion 14J such that the stopper step 192 is positioned at the rear end side.

As illustrated in FIG. 20A, FIG. 20B, and FIG. 21, the cap 20 of the projecting mechanism 160 is a circular cylinder shaped member, and contacts the weight catcher 180 when the weight 170, the weight catcher 180, and the electromagnetic induction refill 50 drop toward the rear end side. The cap 20 is provided with a cap step 24 formed including a step toward the inside of the cap 20 serving as a portion that makes contact with the weight catcher 180. The cap 20 is fitted to the rear shaft rear end portion 14J so as to configure part of the shaft tube 10. Note that the rear end of the cap 20 is formed with the rear end opening 14B through which the electromagnetic induction refill 50 protrudes and retreats.

As illustrated in FIG. 20A, FIG. 20B, and FIG. 21, a circular disc shaped circular disc portion 57 is fitted to a rear end of the electromagnetic induction refill 50 of the fifth exemplary embodiment. The external diameter of the circular disc portion 57 is smaller than the internal diameter of a portion of the stopper 190 located further toward the tip end side than the stopper step 192. The circular disc portion 57 of the electromagnetic induction refill 50 drops further toward the tip end side than the stopper 190 in the safe-kept state illustrated in FIG. 20A, such that the circular disc portion 57 is supported on a support portion 141 provided to the rear shaft rear end portion 14J.

(2) Operation

Explanation follows regarding operation of the fifth exemplary embodiment, specifically a sequence in which the projecting mechanism 160 is operated to cause the electromagnetic induction refill 50 to protrude and to retreat through the rear end opening 14B. Note that the following explanation assumes that the multifunction pen 5E is in the safe-kept state illustrated in FIG. 20A.

When the multifunction pen 5E is inverted from the safe-kept state, such that the rear end opening 14B is facing downward, the weight of the weight 170 causes the weight 170, the weight catcher 180, and the electromagnetic induction refill 50 fixed to the weight catcher 180 to drop toward the rear end side. When this occurs, the electromagnetic induction refill 50 is exposed through the rear end opening 14B. The weight catcher 180 engages with the cap step 24 when this is performed, thereby preventing the electromagnetic induction refill 50 from falling out from the rear shaft rear end portion 14J. The multifunction pen 5E is switched from the safe-kept state to the in-use state in the above manner (see FIG. 20B).

In the in-use state, when the multifunction pen 5E is inclined so as to slant and the electromagnetic induction refill 50 is used to manipulate (press) the input screen of the input device, the weight 170, the weight catcher 180, and the electromagnetic induction refill 50 move toward the tip end side, and the circular disc portion 57 and the stopper step 192 engage with each other. This enables the electromagnetic induction refill 50 to be prevented from moving (dropping) toward the support portion 141 when the electromagnetic induction refill 50 is in use, thereby enabling the electromagnetic induction refill 50 to be used to manipulate the input device in the in-use state.

When the multifunction pen 5E is inverted from the in-use state, such that the rear end opening 14B is facing upward, first the weight 170 drops toward the tip end side. When this occurs, the weight 170 contacts the circular disc portion 57, and the engagement between the circular disc portion 57 and the stopper step 192 is released such that the weight support 180 and the electromagnetic induction refill 50 drop toward the tip end side. Note that after the weight 170 has expelled the circular disc portion 57 that was engaged with the stopper step 192, a tip-side end face of the weight 170 engages with the stopper step 192, preventing the weight 170 from dropping any further toward the tip end side.

The electromagnetic induction refill 50 that has dropped toward the tip end side is guided toward the support portion 141 until the weight support 180 makes contact with the weight 170, such that the circular disc portion 57 is drawn inside the support portion 141. The exposed portion of the electromagnetic induction refill 50 is thus housed in the cap 20, thereby switching from the in-use state to the safe-kept state (see FIG. 20A).

Sixth Exemplary Embodiment

Explanation follows regarding a multifunction pen 5F of a sixth exemplary embodiment, while omitting explanation that would duplicate that of the first, second, third, fourth, fifth exemplary embodiments.

(1) External Appearance of Multifunction Pen 5F

Figure 22A:
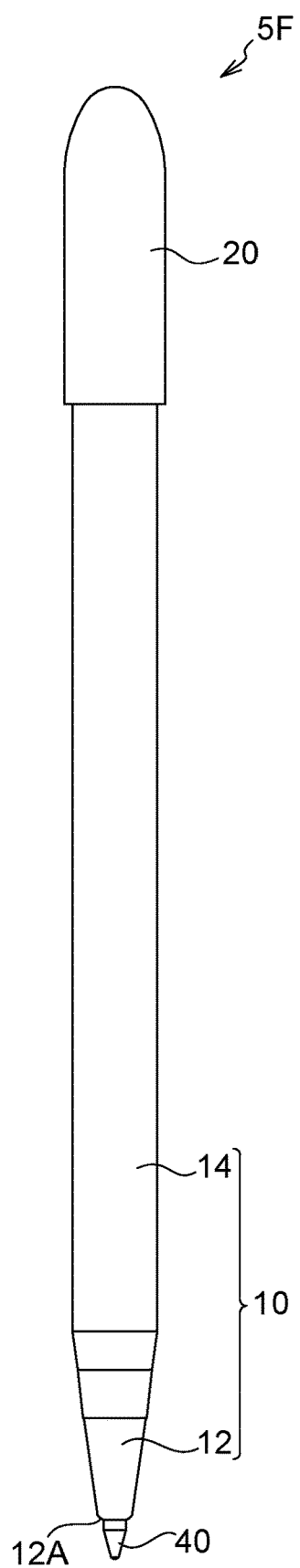
FIG. 22A is a side view illustrating a safe-kept state of a multifunction pen of a sixth exemplary embodiment.
Figure 22B:
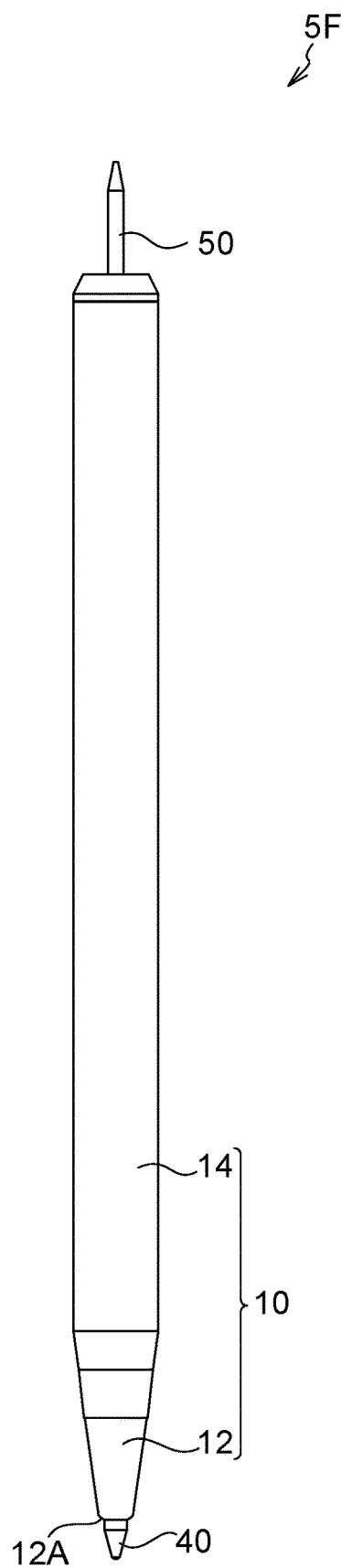
FIG. 22B is a side view illustrating an in-use state of a multifunction pen of the sixth exemplary embodiment.

The multifunction pen 5F according to the sixth exemplary embodiment has the external appearance illustrated in FIG. 22A and FIG. 22B. FIG. 22A illustrates a safe-kept state, and FIG. 22B illustrates an in-use state. In the sixth exemplary embodiment, the cap 20 is capable of being fitted to and removed from the rear shaft 14, and is fitted onto or removed therefrom to switch between the safe-kept state and the in-use state, similarly to in the first and second exemplary embodiments.

(2) Interior of Multifunction Pen 5F

Figure 23A:
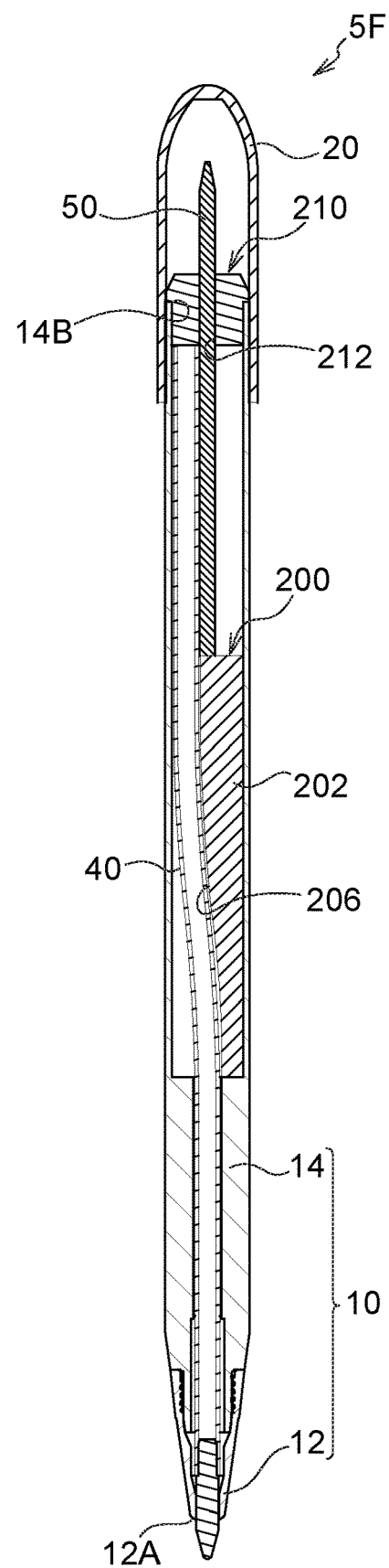
FIG. 23A is a side view cross-section illustrating a safe-kept state of a multifunction pen of the sixth exemplary embodiment.
Figure 23B:
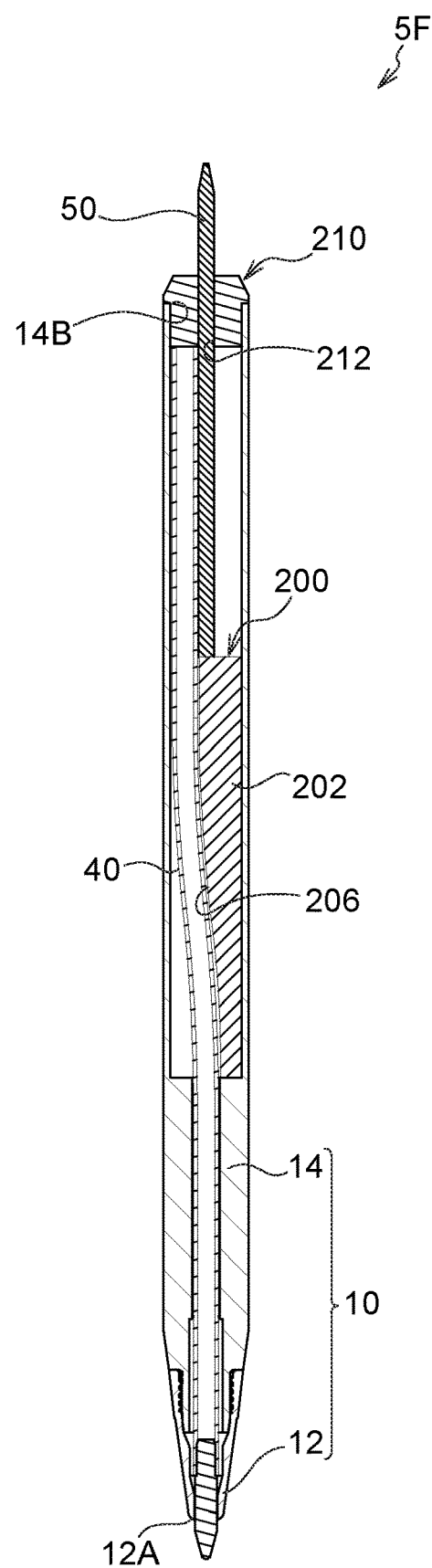
FIG. 23B is a side view cross-section illustrating an in-use state of a multifunction pen of the sixth exemplary embodiment.

FIG. 23A and FIG. 23B are cross-sections corresponding to the multifunction pen 5F illustrated in FIG. 22A and FIG. 22B.

As illustrated in FIG. 23A and FIG. 23B, a directing section 200 is disposed in a tip end side in the internal space of the rear shaft 14 to direct the position of the axial center of a writing refill 40. The directing section 200 will be described in detail later. A lid 210 that is capable of being fitted onto and removed from the rear shaft 14 is fitted onto the rear shaft 14 at the rear end of the rear shaft 14 to close off the rear end opening 14B. The lid 210 is provided with a lid press-fit hole 212 formed with a diameter that is slightly longer than the external diameter of the electromagnetic induction refill 50. A total of two refills, namely a single writing refill 40 and a single electromagnetic induction refill 50, are housed in the rear shaft 14. The sixth exemplary embodiment includes a single writing refill 40, and thus differs from the first to the fifth exemplary embodiments which include plural of the writing refills 40.

Figure 24A:
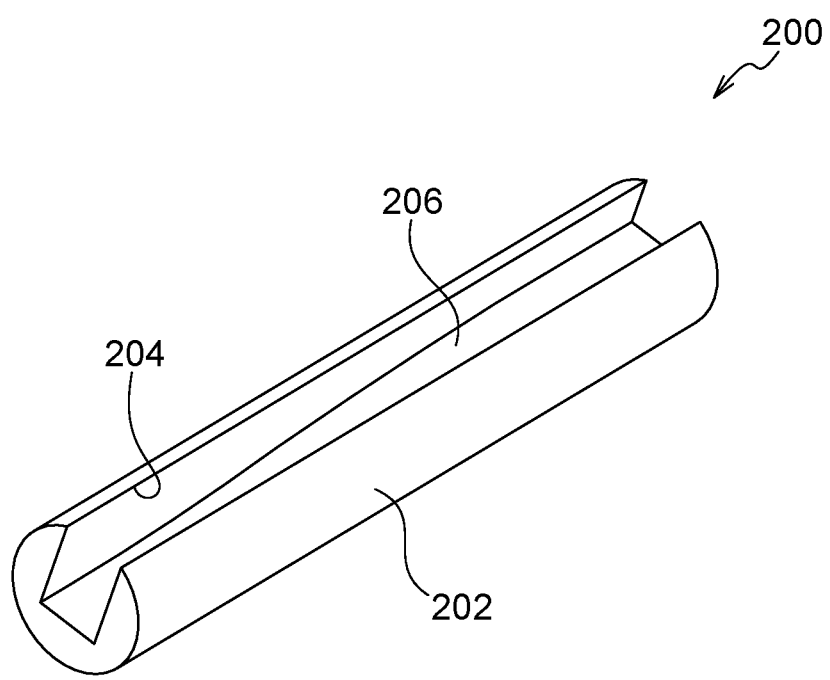
FIG. 24A is a perspective view illustrating a directing section of the sixth exemplary embodiment.
Figure 24B:
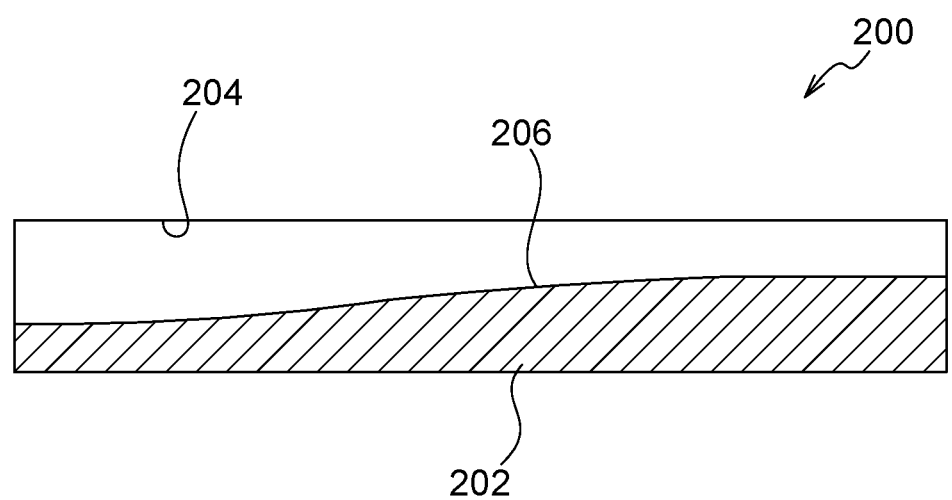
FIG. 24B is a side view cross-section illustrating a directing section of the sixth exemplary embodiment.

As illustrated in FIG. 24A and FIG. 24B, the directing section 200 includes an inclined directing portion 202 that includes an inclined groove 204 formed along an axial direction of the circular column of the directing section 200.

As illustrated in FIG. 24B, the inclined groove 204 has a shape configured by an inclined face 206 that is humped in the radial direction of the inclined directing portion 202 on progression from a tip-side end toward a rear end of the inclined groove 204. The groove depth of a tip end side of the inclined groove 204 is thus greater than the external diameter of the writing refill 40, whereas the groove depth of a rear end side of the inclined groove 204 is approximately the same as the external diameter of the writing refill 40.

As illustrated in FIG. 23A and FIG. 23B, when the writing refill 40 is inserted into the internal space of the rear shaft 14 in a state in which the directing section 200 is disposed in the internal space, the writing refill 40 deforms along the incline of the inclined face 206. The axial center of the tip end side of the writing refill 40 is thus aligned with the axial center of the rear shaft 14 in a state in which the writing refill 40 is housed in the rear shaft 14, whereas the axial center of the rear end side of the writing refill 40 is misaligned with the axial center of the rear shaft 14.

Note that the electromagnetic induction refill 50 of the sixth exemplary embodiment is press-fitted into the lid press-fit hole 212. The electromagnetic induction refill 50 is then inserted into the rear shaft 14 until the rear end of the electromagnetic induction refill 50 makes contact with a rear face of the directing section 200. In a state in which the rear end of the electromagnetic induction refill 50 has made contact with the rear face of the directing section 200, the axial center of the electromagnetic induction refill 50 and the axial center of the rear shaft 14 are aligned with each other. Namely, in a state in which the rear end of the electromagnetic induction refill 50 has made contact with the rear face of the directing section 200, the axial center of the electromagnetic induction refill 50 and the axial center of the rear end side of the writing refill 40 are misaligned with each other.

(3) Other Characteristics

In the sixth exemplary embodiment, the writing refill 40 employed preferably has an axial direction length of at least 95 mm and more preferably at least 120 mm prior to being housed in the rear shaft 14. Moreover, in the sixth exemplary embodiment, the electromagnetic induction refill 50 employed has an axial direction length of at least 50 mm. Furthermore, in the sixth exemplary embodiment, the multifunction pen 5F has an axial direction length of less than 145 mm when in the safe-kept state.

Namely, in the sixth exemplary embodiment, in a state in which the axial center of the electromagnetic induction refill 50 and the axial center of the rear end side of the writing refill 40 are misaligned with each other, since these members are housed in the shaft tube 10, the axial direction length of the multifunction pen 5F can be made shorter. Specifically, since the axial center of the electromagnetic induction refill 50 and the axial center of the rear end side of the writing refill 40 are misaligned with each other in a state housed in the rear shaft 14, the internal space of the shaft tube 10 can be reduced in comparison to configurations in which these axial centers are aligned with each other. Moreover, since the writing refill 40 is deformed along the incline of the inclined face 206 when in a housed state in the shaft tube 10, the axial direction length of the writing refill 40 is shorter than prior to deforming, enabling the internal space of the shaft tube 10 to be reduced in comparison to configurations in which the writing refill 40 is housed in the shaft tube 10 with its axial center running in a straight line.

In the sixth exemplary embodiment, since the axial direction length of the employed writing refill 40 (ballpoint pen refill) prior to being housed in the rear shaft 14 is at least 100 mm, a larger amount of ink can be stored in the ink reservoir tube 42 than in cases in which the ballpoint pen refill employed has an axial direction length of less than 100 mm. The sixth exemplary embodiment accordingly enables the life of the writing refill 40 to be lengthened, while also achieving a reduction in axial direction length in the multifunction pen 5F including the writing refill 40 and the electromagnetic induction refill 50.

The invention claimed is:

1. A multifunction pen comprising:
a shaft tube including openings at both of a tip end and a rear end;
a plurality of writing refills that are housed inside the shaft tube, each of the plurality of writing refills including a writing tip exposed through the opening at the tip end;
a plurality of knock rods that are respectively accessible through window holes in the shaft tube extending along an axial direction of the shaft tube, the plurality of knock rods respectively actuating the plurality of writing refills; and
an electromagnetic induction refill that is housed inside the shaft tube, that is disposed in parallel to the plurality of knock rods, that overlaps the plurality of knock rods in a direction orthogonal to the axial direction of the shaft tube, that is exposed through the opening at the rear end, and that is employed in electromagnetic induction-based input.

2. The multifunction pen of claim 1, wherein an axial center of a rear end side of each of the plurality of writing refills and an axial center of the electromagnetic induction refill are misaligned with each other.

3. The multifunction pen of claim 1, wherein a center of mass of the multifunction pen is positioned further toward a rear end side than a center in an axial direction of the shaft tube.

4. The multifunction pen of claim 1, wherein the electromagnetic induction refill is disposed at an axial center of the shaft tube.

5. The multifunction pen of claim 1, further comprising a sliding cover covering the rear end of the shaft tube and the electromagnetic induction refill, the sliding cover being guided by movement grooves in the shaft tube extending in the axial direction of the shaft tube in parallel with the window holes, the sliding cover having an exposing opening allowing the electromagnetic induction refill to be exposed with the sliding cover being slid toward the tip end of the shaft tube.

* * * * *